US010885403B2

(12) United States Patent
Hoshino

(10) Patent No.: US 10,885,403 B2
(45) Date of Patent: Jan. 5, 2021

(54) IMAGE PROCESSING DEVICE, IMAGING DEVICE, AND IMAGE PROCESSING METHOD

(71) Applicant: Sony Semiconductor Solutions Corporation, Kanagawa (JP)

(72) Inventor: Kazuhiro Hoshino, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 26 days.

(21) Appl. No.: 16/246,340

(22) Filed: Jan. 11, 2019

(65) Prior Publication Data

US 2019/0147306 A1    May 16, 2019

Related U.S. Application Data

(63) Continuation of application No. 15/540,597, filed as application No. PCT/JP2015/079798 on Oct. 22, 2015, now Pat. No. 10,217,034.

(30) Foreign Application Priority Data

Jan. 8, 2015 (JP) ................................ 2015-002390

(51) Int. Cl.
G06K 9/00         (2006.01)
G06K 9/80         (2006.01)
(Continued)

(52) U.S. Cl.
CPC ........... *G06K 9/80* (2013.01); *G06K 9/00771* (2013.01); *G06K 9/209* (2013.01); *G06K 9/325* (2013.01);
(Continued)

(58) Field of Classification Search
None
See application file for complete search history.

(56) References Cited

U.S. PATENT DOCUMENTS 5,809,161 A * 9/1998 Auty .................... G01P 3/38
                                                    340/937
6,373,962 B1 * 4/2002 Kanade ............... G06K 9/3258
                                                    340/907
(Continued)

FOREIGN PATENT DOCUMENTS

JP   2000-182182 A    6/2000
JP   2006-53681 A     2/2006
(Continued)

OTHER PUBLICATIONS

International Search Report and Written Opinion and English translation thereof dated Jan. 12, 2016 in connection with International Application No. PCT/JP2015/079798.
(Continued)

*Primary Examiner* — Shervin K Nakhjavan
(74) *Attorney, Agent, or Firm* — Wolf, Greenfield & Sacks, P.C.

(57) ABSTRACT

Visibility of a license plate and color reproducibility of a vehicle body are improved in a monitoring camera. A vehicle body area detection unit detects a vehicle body area of a vehicle from an image signal. A license plate area detection unit detects a license plate area of the vehicle from the image signal. A vehicle body area image processing unit performs processing of the image signal corresponding to the detected vehicle body area. A license plate area image processing unit performs processing different from the processing of the image signal corresponding to the vehicle body area on the image signal corresponding to the detected license plate area. A synthesis unit synthesizes the processed image signal corresponding to the vehicle body area and the processed image signal corresponding to the license plate area.

13 Claims, 20 Drawing Sheets

(51) Int. Cl.

| | | |
|---|---|---|
| *G06T 1/00* | (2006.01) | |
| *G08G 1/04* | (2006.01) | |
| *H04N 7/18* | (2006.01) | |
| *G06T 5/00* | (2006.01) | |
| *G06T 5/50* | (2006.01) | |
| *G08G 1/017* | (2006.01) | |
| *H04N 5/14* | (2006.01) | |
| *H04N 5/208* | (2006.01) | |
| *H04N 5/225* | (2006.01) | |
| *H04N 5/33* | (2006.01) | |
| *H04N 5/357* | (2011.01) | |
| *H04N 9/04* | (2006.01) | |
| *H04N 9/64* | (2006.01) | |
| *G06T 7/73* | (2017.01) | |
| *G06K 9/20* | (2006.01) | |
| *G06T 7/223* | (2017.01) | |
| *G06K 9/32* | (2006.01) | |
| *G06K 9/46* | (2006.01) | |
| *G06K 9/54* | (2006.01) | |

(52) U.S. Cl.
CPC ......... *G06K 9/4652* (2013.01); *G06K 9/4661* (2013.01); *G06K 9/54* (2013.01); *G06T 1/00* (2013.01); *G06T 5/002* (2013.01); *G06T 5/003* (2013.01); *G06T 5/50* (2013.01); *G06T 7/223* (2017.01); *G06T 7/74* (2017.01); *G08G 1/0175* (2013.01); *G08G 1/04* (2013.01); *H04N 5/144* (2013.01); *H04N 5/208* (2013.01); *H04N 5/2256* (2013.01); *H04N 5/332* (2013.01); *H04N 5/357* (2013.01); *H04N 7/18* (2013.01); *H04N 9/045* (2013.01); *H04N 9/04553* (2018.08); *H04N 9/04559* (2018.08); *H04N 9/646* (2013.01); *G06K 9/2018* (2013.01); *G06K 2209/15* (2013.01); *G06K 2209/23* (2013.01); *G06T 2207/10016* (2013.01); *G06T 2207/10024* (2013.01); *G06T 2207/10048* (2013.01); *G06T 2207/20192* (2013.01); *H04N 2209/045* (2013.01); *H04N 2209/046* (2013.01)

(56) References Cited

U.S. PATENT DOCUMENTS

| | | | | |
|---|---|---|---|---|
| 6,754,369 B1* | 6/2004 | Sazawa | ................ | G06K 9/3266 382/105 |
| 8,331,621 B1* | 12/2012 | Allen | ..................... | G08G 1/015 382/104 |
| 2002/0175999 A1* | 11/2002 | Mutobe | ..................... | B60R 1/00 348/148 |
| 2006/0030985 A1* | 2/2006 | Lawida | ................ | G06K 9/3241 701/33.4 |
| 2006/0165288 A1* | 7/2006 | Lee | ......................... | G06K 9/325 382/181 |
| 2006/0215882 A1* | 9/2006 | Ando | ................... | H04N 5/2355 382/106 |
| 2007/0058863 A1* | 3/2007 | Boregowda | .......... | G06K 9/3258 382/170 |
| 2007/0285809 A1* | 12/2007 | Takahashi | ............... | G08G 1/017 359/851 |
| 2008/0175438 A1* | 7/2008 | Alves | .................... | G08G 1/0175 382/105 |
| 2011/0043341 A1* | 2/2011 | Kumagami | ............... | B60R 1/00 340/425.5 |
| 2011/0135156 A1* | 6/2011 | Chen | ...................... | G06K 9/325 382/105 |
| 2012/0069183 A1* | 3/2012 | Aoki | .................... | G06K 9/00771 348/148 |
| 2013/0050492 A1* | 2/2013 | Lehning | ............. | G06K 9/00785 348/148 |
| 2013/0136310 A1* | 5/2013 | Hofman | ............... | G06K 9/6282 382/105 |
| 2013/0162817 A1* | 6/2013 | Bernal | ............... | G06K 9/00228 348/143 |
| 2013/0235201 A1* | 9/2013 | Kiyohara | ........... | G06K 9/00805 348/148 |
| 2013/0236063 A1* | 9/2013 | Shin | ....................... | G08G 1/017 382/105 |
| 2013/0325629 A1* | 12/2013 | Harrison | ................ | G08G 1/015 705/14.66 |
| 2014/0029804 A1* | 1/2014 | Kawaguchi | ............. | G06T 11/60 382/105 |
| 2014/0147008 A1* | 5/2014 | Aoki | .................... | G08G 1/0175 382/104 |
| 2015/0125042 A1* | 5/2015 | Haden | ..................... | G06K 9/00771 382/105 |
| 2015/0294174 A1* | 10/2015 | Karkowski | ......... | G06F 16/5838 382/182 |
| 2016/0092473 A1* | 3/2016 | Rodriguez-Serrano | ..................... | G06F 16/5846 707/769 |
| 2017/0200057 A1* | 7/2017 | Hyuga | ..................... | G06K 9/38 |
| 2017/0357881 A1 | 12/2017 | Hoshino | | |

FOREIGN PATENT DOCUMENTS

| | | |
|---|---|---|
| JP | 2006-201817 A | 8/2006 |
| JP | 2008-042695 A | 2/2008 |
| JP | 2013-149040 A | 8/2013 |

OTHER PUBLICATIONS

International Preliminary Report on Patentability and English translation thereof dated Jul. 20, 2017 in connection with International Application No. PCT/JP2015/079798.

\* cited by examiner a b a b a b a b

IMAGE PROCESSING DEVICE, IMAGING DEVICE, AND IMAGE PROCESSING METHOD

CROSS REFERENCE TO RELATED APPLICATIONS

This application is a continuation under 35 U.S.C. § 120 of U.S. patent application Ser. No. 15/540,597 entitled "IMAGE PROCESSING DEVICE, IMAGING DEVICE, AND IMAGE PROCESSING METHOD," which entered the U.S. National Stage on Jun. 29, 2017, under 35 U.S.C. § 371, of International Application No. PCT/JP2015/079798 filed in the Japanese Patent Office on Oct. 22, 2015, which claims the benefit of priority of Japanese Patent Application No. JP2015-002390 filed in the Japanese Patent Office on Jan. 8, 2015, each of which is hereby incorporated by reference in its entirety. U.S. patent application Ser. No. 15/540,597 issued as U.S. Pat. No. 10,217,034 on Feb. 26, 2019.

TECHNICAL FIELD

The present technology relates to an image processing device. In detail, this relates to the image processing device, the imaging device, and the image processing method used in a monitoring camera.

BACKGROUND ART

Conventionally, a monitoring device which obtains a characteristic of a vehicle to specify the vehicle is used as a monitoring device of the vehicle. For example, a monitoring device which detects a position of a license plate of the vehicle and obtains a color of a vehicle body on the basis of the position of the license plate to specify the vehicle is suggested (for example, refer to Patent Document 1).

CITATION LIST

Patent Document

Patent Document 1: Japanese Patent Application Laid-Open No. 2006-201817

SUMMARY OF THE INVENTION

Problems to be Solved by the Invention

In the above-described conventional technology, the detected position of the license plate is used only for setting a vehicle body color discriminating area for specifying the color of the vehicle body. That is to say, special processing is not performed for a license plate area. Therefore, the conventional technology has a problem that only the color of the vehicle body is detected and a process of improving reading of the license plate indispensable for specifying the vehicle is not performed.

The present technology is achieved in view of such a condition and an object thereof is to improve visibility of the license plate and color reproducibility of the vehicle body for easily reading the license plate and obtaining the color of the vehicle body.

Solutions to Problems

The present technology is achieved for solving the above-described problem, and a first aspect thereof is an image processing device provided with a vehicle body area detection unit which detects a vehicle body area of a vehicle from an image signal, a license plate area detection unit which detects a license plate area of the vehicle from the image signal, a vehicle body area image processing unit which performs processing of the image signal corresponding to the detected vehicle body area, a license plate area image processing unit which performs processing different from the processing of the image signal corresponding to the vehicle body area on the image signal corresponding to the detected license plate area, and a synthesis unit which synthesizes the processed image signal corresponding to the vehicle body area and the processed image signal corresponding to the license plate area. With this arrangement, there is an effect that different processing is performed for the image signal corresponding to the license plate area and the image signal corresponding to the vehicle body area.

Also, in the first aspect, the license plate area image processing unit may perform luminance signal conversion processing to convert the image signal corresponding to the license plate area to a luminance signal corresponding to the license plate area and edge enhancement processing to enhance an edge portion of the image in the luminance signal. With this arrangement, there is an effect that the edge portion of the image in the luminance signal corresponding to the license plate area is enhanced.

Also, in the first aspect, the license plate area image processing unit may perform luminance signal conversion processing to convert the image signal corresponding to the license plate area to a luminance signal corresponding to the license plate area and two-dimensional noise reduction processing to remove noise of the luminance signal by attenuating high-frequency components of luminance signals belonging to the same frame. With this arrangement, there is an effect that noise of the image in the luminance signal corresponding to the license plate area is removed.

Also, in the first aspect, the vehicle body area image processing unit may perform luminance/chrominance signal conversion processing to convert the image signal corresponding to the vehicle body area to a luminance signal and a chrominance signal corresponding to the vehicle body area and three-dimensional noise reduction processing to remove noise of the luminance signal and the chrominance signal by using luminance signals and chrominance signals belonging to a plurality of continuous frames. With this arrangement, there is an effect that noise of the luminance signal and the chrominance signal corresponding to the vehicle body area is removed.

Also, in the first aspect, the image signal includes image signals corresponding to red light, green light, blue light, and infrared light, and the vehicle body area image processing unit may perform processing of the image signals corresponding to the red light, the green light, and the blue light included in the image signal corresponding to the vehicle body area, and the license plate area image processing unit may perform processing of an image signal corresponding to the infrared light included in the image signal corresponding to the license plate area. With this arrangement, there is an effect that processing by the vehicle body area image processing unit is performed for the image signals corresponding to the red light, the green light, and the blue light included in the image signal corresponding to the vehicle body area and processing by the license plate area image processing unit is performed for the image signal corresponding to the infrared light included in the image signal corresponding to the license plate area.

Also, in the first aspect, the image signal further includes an image signal corresponding to white light, and the vehicle body area image processing unit may perform processing of the image signals corresponding to the red light, the green light, the blue light, and the white light included in the image signal corresponding to the vehicle body area. With this arrangement, there is an effect that the processing by the vehicle body area image processing unit is performed for the image signals corresponding to the red light, the green light, the blue light, and the white light included in the image signal corresponding to the vehicle body area.

Also, in the first aspect, the image signal includes image signals corresponding to red light, green light, blue light, and infrared light, a saturation detection unit which detects whether an image signal corresponding to the infrared light included in the image signal is saturated is further provided, and the license plate area image processing unit may perform processing of the image signal corresponding to the infrared light included in the image signal corresponding to the license plate area in a case where the saturation detection unit detects that the image signal corresponding to the infrared light is not saturated and may perform processing of the image signals corresponding to the red light, the green light, and the blue light included in the image signal corresponding to the license plate area in a case where the saturation detection unit detects that the image signal corresponding to the infrared light is saturated. With this arrangement, there is an effect that the license plate area image processing unit performs processing for the image signal corresponding to the infrared light in a case where the image signal corresponding to the infrared light is not saturated and performs the processing for the image signals corresponding to the red light, the green light, and the blue light in a case where the image signal corresponding to the infrared light is saturated.

Also, a second aspect of the present technology is an imaging device provided with an image sensor which generates an image signal, a vehicle body area detection unit which detects a vehicle body area of a vehicle from the image signal, a license plate area detection unit which detects a license plate area of the vehicle from the image signal, a vehicle body area image processing unit which performs processing of the image signal corresponding to the detected vehicle body area, a license plate area image processing unit which performs processing different from the processing of the image signal corresponding to the vehicle body area on the image signal corresponding to the detected license plate area, and a synthesis unit which synthesizes the processed image signal corresponding to the vehicle body area and the processed image signal corresponding to the license plate area. With this arrangement, there is an effect that different processing is performed for the image signal corresponding to the license plate area and the image signal corresponding to the vehicle body area.

Also, a third aspect of the present technology is an image processing method provided with a vehicle body area detecting procedure to detect a vehicle body area of a vehicle from an image signal, a license plate area detecting procedure to detect a license plate area of the vehicle from the image signal, a vehicle body area image processing procedure to perform processing of the image signal corresponding to the detected vehicle body area, a license plate area image processing procedure to perform processing different from the processing of the image signal corresponding to the vehicle body area on the image signal corresponding to the detected license plate area, and a synthesis procedure to synthesize the processed image signal corresponding to the vehicle body area and the processed image signal corresponding to the license plate area. With this arrangement, there is an effect that different processing is performed for the image signal corresponding to the license plate area and the image signal corresponding to the vehicle body area.

Effects of the Invention

According to the present technology, there is an excellent effect that the license plate is easily read and the color of the vehicle body is easily obtained by improving the visibility of the license plate and the color reproducibility of the vehicle body. Meanwhile, the effect is not necessarily limited to the effect herein described and may be any of the effects described in the present disclosure.

MODE FOR CARRYING OUT THE INVENTION

Modes for carrying out the present technology (hereinafter, referred to as embodiments) are hereinafter described. The description is given in the following order.
1. First Embodiment (Example of Case Where Image of License Plate Area Is Processed by Using Infrared Light Signal)
2. Second Embodiment (Example of Case in Where Image of License Plate Area Is Processed by Using Infrared Light Signal or Visible Light Signal)
3. Third Embodiment (Example of Case Where Color of License Plate Is Displayed)
4. Fourth Embodiment (Example of Case Where Image Sensor Including Pixel Corresponding White Light Is Used)
5. Variation 1. First Embodiment

[Configuration of Imaging Device]

Figure 1:
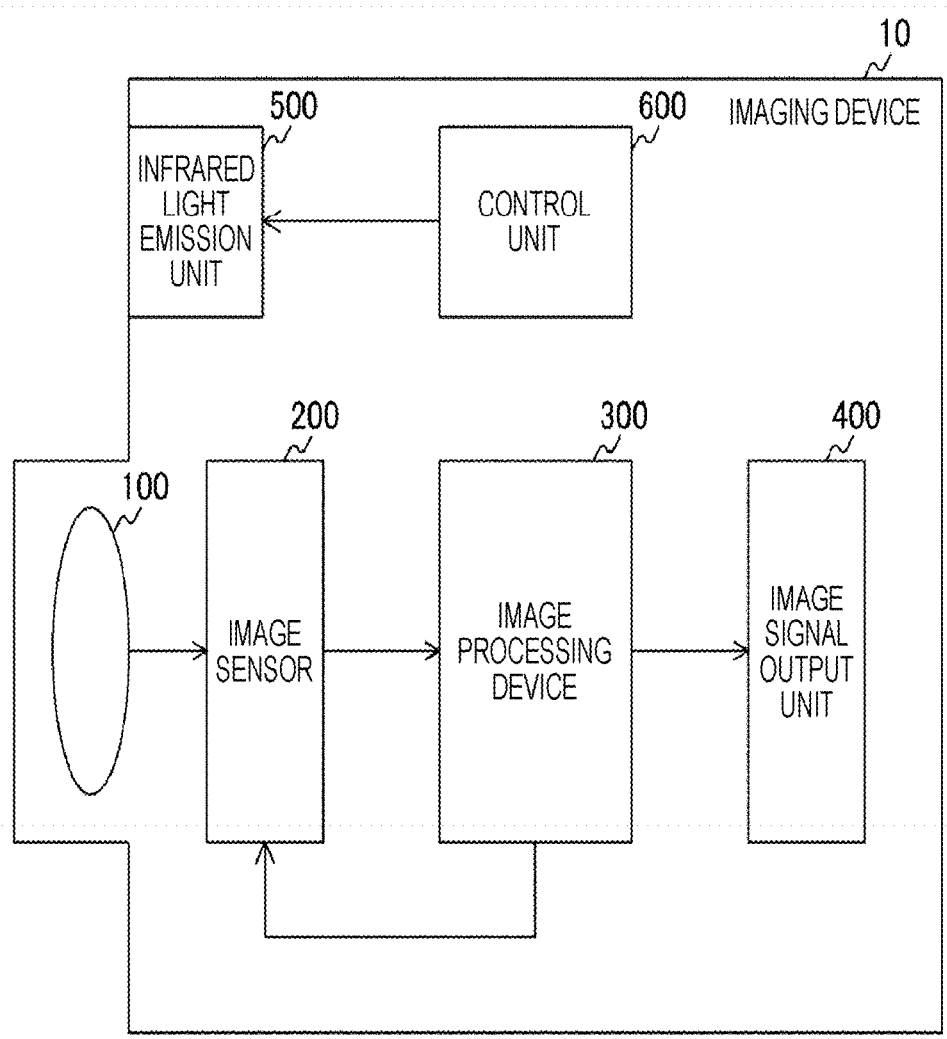
FIG. 1 is a view illustrating a configuration example of an imaging device of an embodiment of the present technology.

FIG. 1 is a view illustrating a configuration example of an imaging device in an embodiment of the present technology. An imaging device 10 in this drawing is provided with a lens 100, an image sensor 200, an image processing device 300, an image signal output unit 400, an infrared light emission unit 500, and a control unit 600.

The lens 100 optically forms an image of an object on the image sensor 200. The image sensor 200 converts an optical image formed by the lens 100 to an image signal to output. The image sensor 200 is configured such that pixels which generate the image signal are arranged in a two-dimensional manner on a surface on which the optical image is formed. The image signal output from the pixel includes a visible light signal corresponding to a visible light component and an infrared signal corresponding to an infrared light component.

The following image sensor may be used as the image sensor 200 including such pixels. For example, the image sensor including the pixel which outputs the image signal corresponding to red light and infrared light, the pixel which outputs the image signal corresponding to green light and the infrared light, the pixel which outputs the image signal corresponding to blue light and the infrared light, and the pixel which outputs the image signal corresponding to the infrared light may be used. For example, the image sensor including a total of five types of pixels including the pixel which outputs the image signal corresponding to white light and the infrared light in addition to the above-described pixels may also be used.

Hereinafter, the image signal corresponding to the red light and the infrared light, the image signal corresponding to the green light and the infrared light, and the image signal corresponding to the blue light and the infrared light are referred to as an R+IR signal, a G+IR signal, and a B+IR signal, respectively. Also, the image signal corresponding to the white light and the infrared light and the image signal corresponding to the infrared light are referred to as a W+IR signal and an IR signal, respectively. Furthermore, the pixels which output the R+IR signal, the G+IR signal, the B+IR signal, the W+IR signal, and the IR signal are referred to as an R+IR pixel, a G+IR pixel, a B+IR pixel, a W+IR pixel, and an IR pixel, respectively. Each pixel is provided with a color filter so as to be configured as the pixel corresponding to different lights in this manner. A spectral characteristic of the color filter is allowed to correspond to specific light to form the above-described four or five types of pixels.

The image processing device 300 processes the image signal. The image processing device 300 converts the image signal output from the image sensor 200 to a luminance signal and a chrominance signal and processes the signals to output.

The image signal output unit 400 outputs the image signal processed by the image processing device 300 out of the imaging device 10. The image signal output unit 400 converts the image signal so as to comply with standards of a signal line interface to which the imaging device 10 is connected to output.

The control unit 600 controls an entire imaging device 10. The infrared light emission unit 500 irradiates the object with the infrared light. The infrared light emission unit 500 is controlled by the control unit 600.

[Configuration of Image Sensor]

Figure 2:
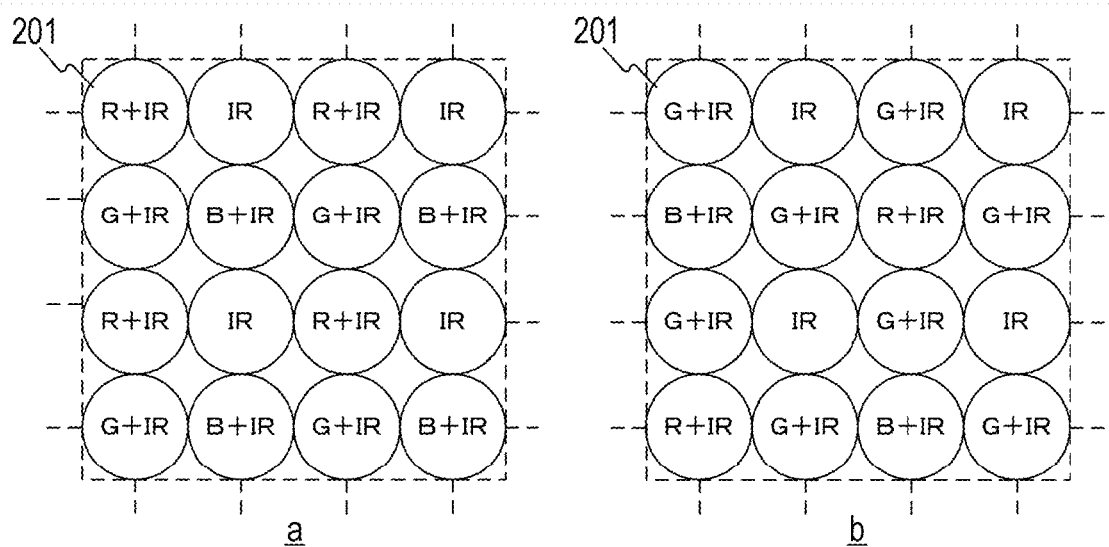
FIG. 2 is a view illustrating a configuration example of an image sensor 200 in the embodiment of the present technology.
Figure 2:
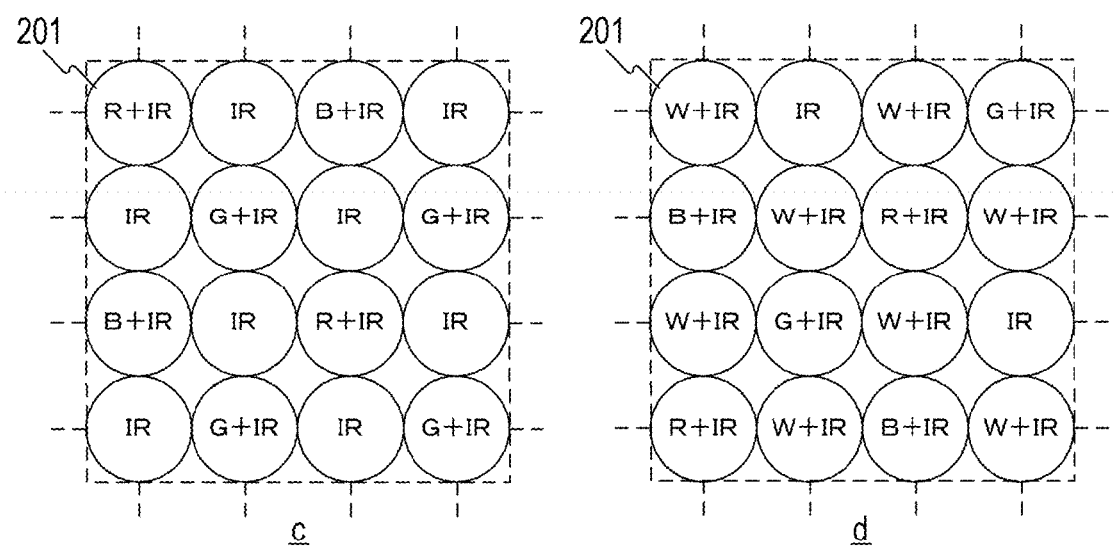

FIG. 2 is a view illustrating a configuration example of the image sensor 200 in the embodiment of the present technology. Arrangement of pixels 201 on a screen of the image sensor 200 is illustrated in this drawing. Meanwhile, a sign assigned to the pixel 201 indicates a type of the pixel 201. The pixels assigned with signs R+IR, G+IR, B+IR, W+IR, and IR are the R+IR pixel, the G+IR pixel, the B+IR pixel, the W+IR pixel, and the IR pixel, respectively. The pixels are arranged on the screen according to a certain rule.

In a of this drawing, one of two G+IR pixels is replaced with the IR pixel in a Bayer array of the R+IR pixel, the G+IR pixel, and the B+IR pixel. The pixels corresponding to red, green, and blue are arranged in a balanced manner, so that the array has high color reproducibility. In b of this drawing, the R+IR pixel, the B+IR pixel, and the IR pixel are arranged in positions other than a pixel position of the G+IR pixel in a checkered pattern array of the G+IR pixels. Since there are many pixels corresponding to green, the array has high resolution. In c of this drawing, the R+IR pixel, the G+IR pixel, and the B+IR pixel are arranged in positions other than the pixel position of the IR pixel in the checkered pattern array of the IR pixels. Many IR pixels are arranged, so that the array has high resolution for the infrared light. In d of this drawing, the R+IR pixel, the G+IR pixel, the B+IR pixel, and the IR pixel are arranged in positions other than the pixel position of the W+IR pixel in the checkered pattern array of the W+IR pixels. Many pixels corresponding to white are arranged, so that the array has high sensitivity.

Meanwhile, the image sensor including the R+IR pixel, the G+IR pixel, the B+IR pixel, and the IR pixel illustrated in a to c of this drawing is supposed as the image sensor 200 in the first embodiment of the present technology.

[Configuration of Image Processing Device]

Figure 3:
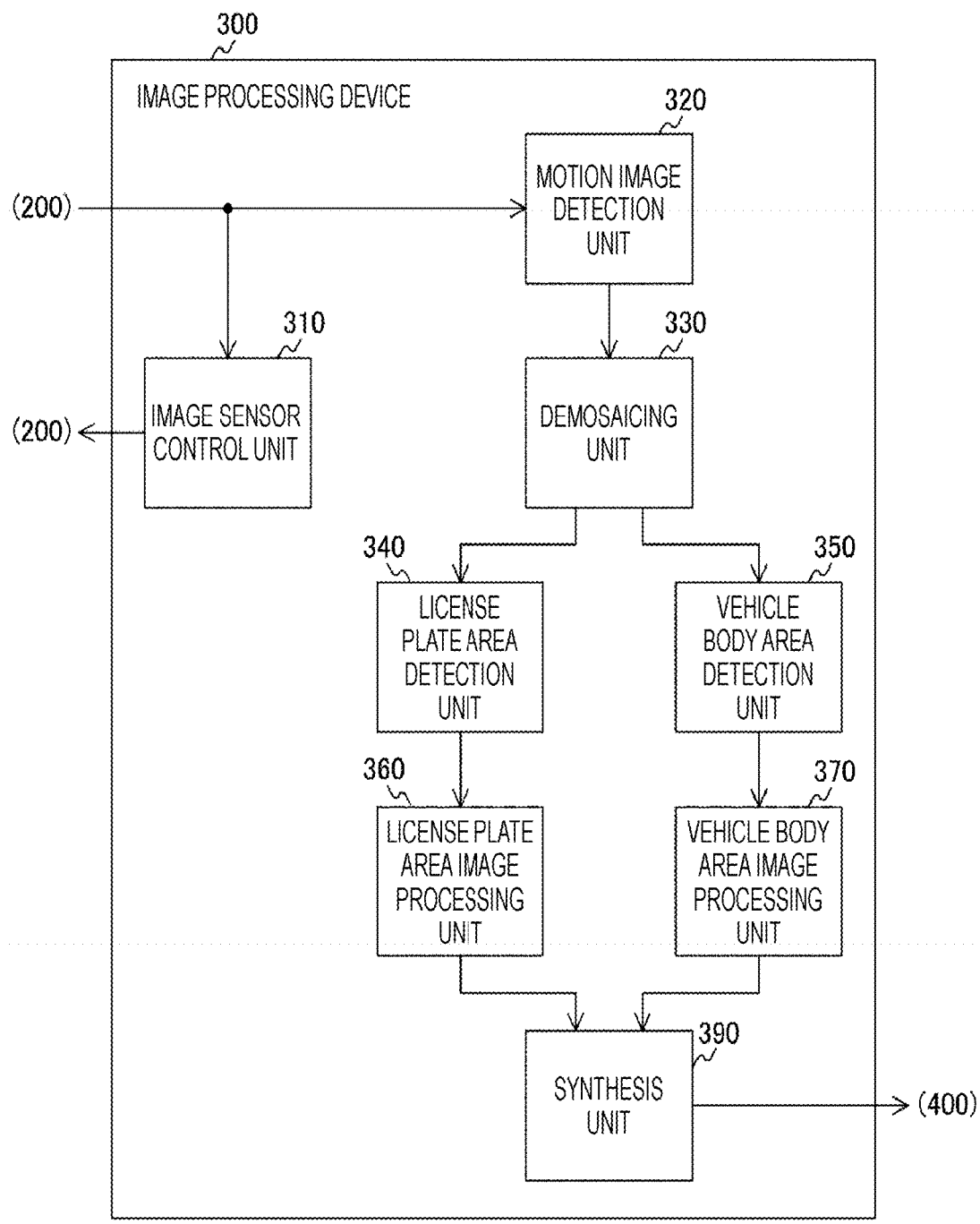
FIG. 3 is a view illustrating a configuration example of an image processing device 300 in a first embodiment of the present technology.

FIG. 3 is a view illustrating a configuration example of the image processing device 300 in the first embodiment of the present technology. The image processing device 300 is provided with an image sensor control unit 310, a motion image detection unit 320, a demosaicing unit 330, and a license plate area detection unit 340. Also, the image processing device 300 is further provided with a license plate area image processing unit 360, a vehicle body area detection unit 350, a vehicle body area image processing unit 370, and a synthesis unit 390.

The image sensor control unit 310 controls the image sensor 200. The image sensor control unit 310 performs focus control, exposure control, output control of the image signal and the like on the image sensor 200.

The motion image detection unit 320 detects an image area with motion in the image signal output from the image sensor 200. A well-known method, for example, a method by block matching used in Moving Picture Experts Group (MPEG) and the like may be used for detecting the image area with motion.

The demosaicing unit 330 performs demosaic processing. The demosaic processing interpolates an insufficient image signal for the image signal of a single color output from the image sensor 200. The image signal per pixel increases to four signals of the R+IR signal, the G+IR signal, the B+IR signal, and the IR signal by the demosaic processing. Also, the demosaicing unit 330 further performs infrared light component removal processing to remove the infrared light component from the R+IR signal, the G+IR signal, and the B+IR signal. Herein, the signals obtained by removing the infrared light component from the R+IR signal, the G+IR signal, and the B+IR signal are referred to as an R signal, a G signal, and a B signal, respectively. The infrared light component removal processing may be performed as represented by the following equations, for example.

$$R = R_{+IR} - IR$$

$$G = G_{+IR} - IR$$

$$B = B_{+IR} - IR$$

in which, R, G, B, and IR represent the R signal, the G signal, the B signal, and the IR signal, respectively. $R_{+IR}$, $G_{+IR}$, and $B_{+IR}$ represent the R+IR signal, the G+IR signal, and the B+IR signal, respectively.

The vehicle body area detection unit 350 detects a vehicle body area from the image area with motion detected by the motion image detection unit 320. It is possible to use a well-known method, for example, a method of holding a gray-scale template in which the image of the vehicle body is illustrated as a gray-scale image and performing pattern matching of the input image and the gray-scale template to detect the vehicle body area.

The license plate area detection unit 340 detects a license plate area from the image area with motion detected by the motion image detection unit 320. It is possible to use a well-known method for detecting the license plate area. For example, it is possible to use a method of generating an image obtained by binarizing the image signal of the vehicle body and searching a portion coincident with a pattern array specific to the license plate in the area of the image to detect a license plate position.

The vehicle body area image processing unit 370 processes the image signal corresponding to the vehicle body area detected by the vehicle body area detection unit 350. The vehicle body area image processing unit 370 performs processing to improve the color reproducibility of the vehicle body. The vehicle body area image processing will be described later in detail.

The license plate area image processing unit 360 processes the image signal corresponding to the license plate area detected by the license plate area detection unit 340. The license plate area image processing unit 360 performs processing different from the processing by the vehicle body area image processing unit 370 described above. That is to say, this performs processing to improve visibility of the license plate. The license plate area image processing is described later in detail.

The synthesis unit 390 synthesizes the image signals processed by the vehicle body area image processing unit 370 and the license plate area image processing unit 360.

Meanwhile, each processing by the above-described image processing device 300 may be realized by hardware which performs the processing. It is also possible to be equipped with a microcomputer and a DSP to realize as processing by software.

[Demosaic Processing]

Figure 4:
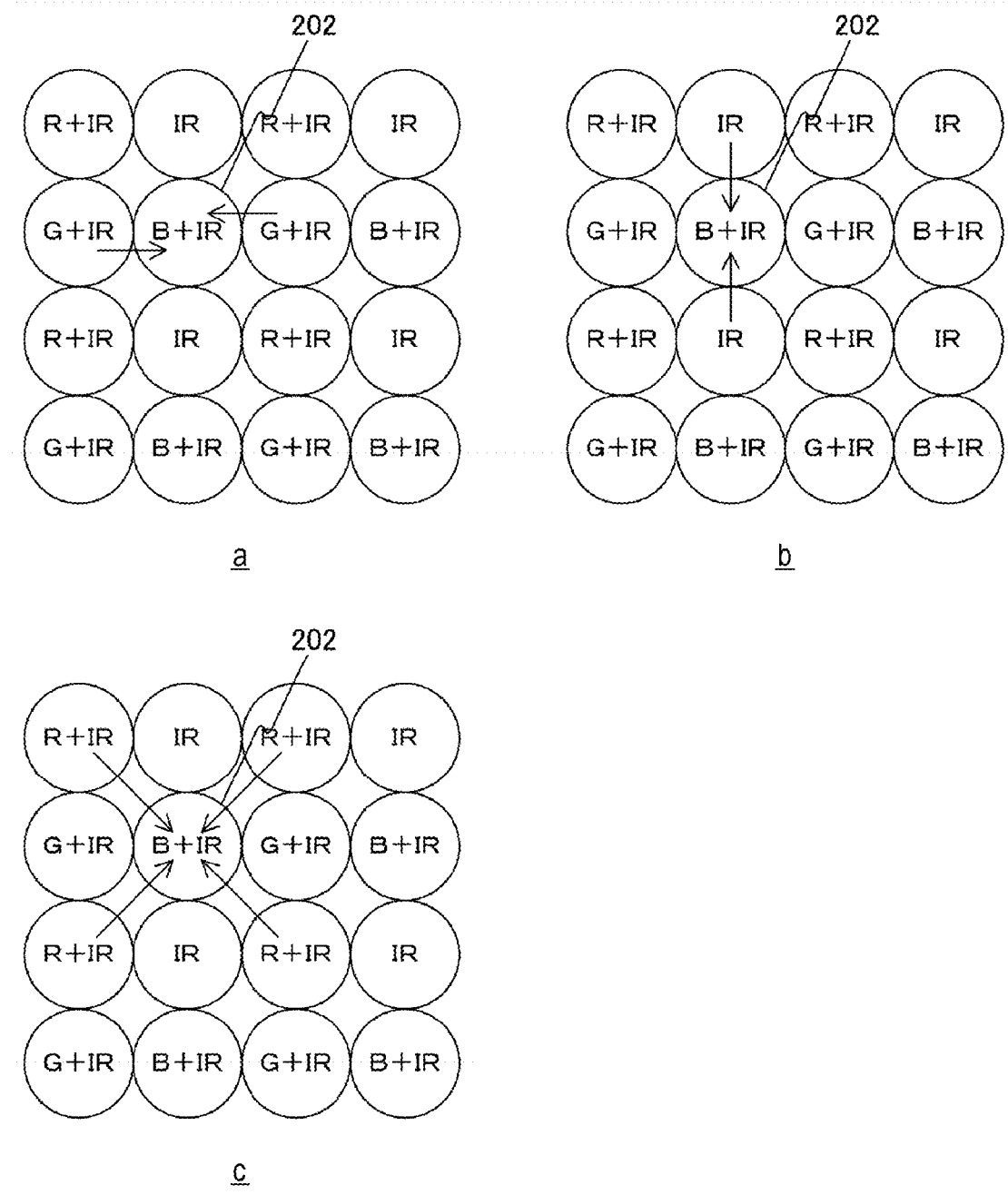
FIG. 4 is a view illustrating demosaic processing in the first embodiment of the present technology.

FIG. 4 is a view illustrating the demosaic processing in the first embodiment of the present technology. A case where the demosaic processing is performed on a pixel 202 is illustrated in this drawing. The pixel 202 being the B+IR pixel outputs the B+IR signal. The image signal corresponding to another color is interpolated in the pixel position of the pixel 202. An example of a case where the G+IR signal is interpolated in the pixel 202 is illustrated in a of this drawing. An average value of the G+IR signals of the G+IR pixels arranged on right and left sides of the pixel 202 is made the G+IR signal of the pixel 202. An example of a case where the IR signal is interpolated in the pixel 202 is illustrated in b of this drawing. An average value of the IR signals of the IR pixels arranged above and below the pixel 202 is made the IR signal of the pixel 202. An example of a case where the R+IR signal is interpolated in the pixel 202 is illustrated in c of this drawing. An average value of the R+IR signals adjacent to the pixel 202 in oblique directions of the pixel 202 is made the R+IR signal of the pixel 202. In this manner, in the demosaic processing in this drawing, the interpolation is performed by using only the image signals of the adjacent pixels. After the demosaic processing, the infrared light component removal processing is performed.

[License Plate Area Image Processing Unit]

Figure 5:
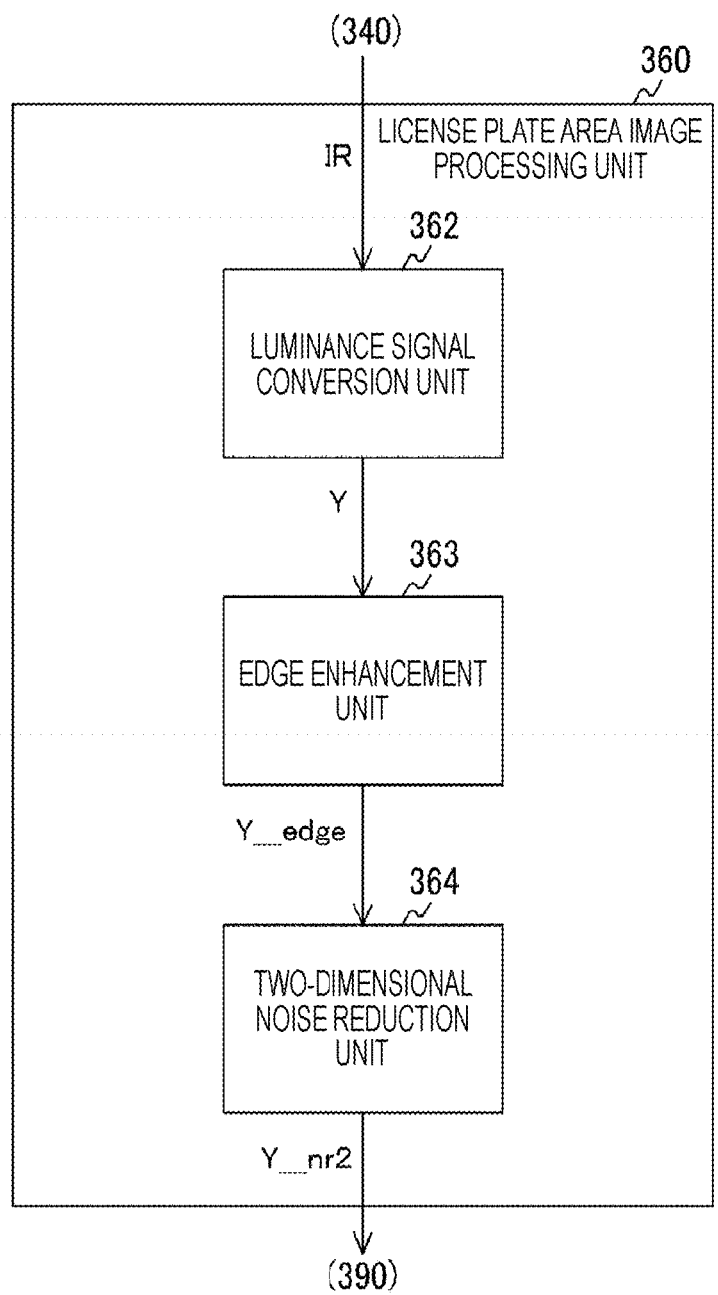
FIG. 5 is a view illustrating a configuration example of a license plate area image processing unit 360 in the first embodiment of the present technology.

FIG. 5 is a view illustrating a configuration example of the license plate area image processing unit 360 in the first embodiment of the present technology. The license plate area image processing unit 360 is provided with a luminance signal conversion unit 362, an edge enhancement unit 363, and a two-dimensional noise reduction unit 364.

The luminance signal conversion unit 362 converts the IR signal out of the image signal corresponding to the license plate area to a luminance signal (Y signal). The conversion is performed as represented by the following equation.

$$Y = IR$$

in which, Y and IR represent the Y signal and the IR signal, respectively. In this manner, the luminance signal conversion unit 362 converts the IR signal in the license plate area to the Y signal. Since the chrominance signal is not used, the image of the license plate area after the license plate area image processing is a monochrome image.

The edge enhancement unit 363 performs edge enhancement processing on the Y signal in the license plate area. Meanwhile, an Y_edge signal in this drawing represents the Y signal on which the edge enhancement processing is performed. The edge enhancement processing is processing to enhance the edge portion of the image. A well-known method may be used in the edge enhancement processing. For example, it is possible to use a method of detecting the edge portion from the image and improving luminance of the detected edge portion to enhance the edge portion.

The two-dimensional noise reduction unit 364 performs two-dimensional noise reduction processing on the Y_edge signal. Meanwhile, a Y_nr2 signal in this drawing represents the Y signal on which the two-dimensional noise reduction processing is performed. Herein, the noise reduction processing is the processing to remove superimposed noise. Also, the two-dimensional noise reduction processing is the processing to remove the noise by attenuating high-frequency components of the image signals belonging to the same frame.

[Two-Dimensional Noise Reduction Processing]

Figure 6:
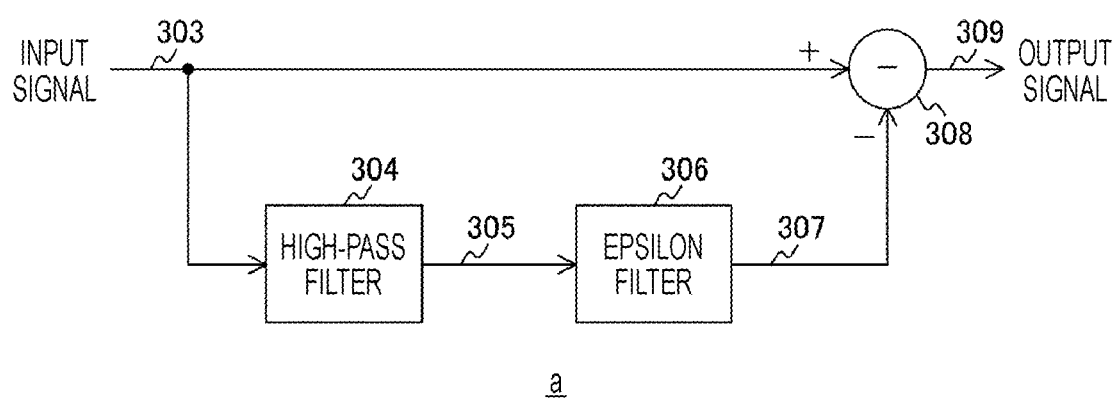
FIG. 6 is a view illustrating two-dimensional noise reduction processing in the first embodiment of the present technology.
Figure 6:
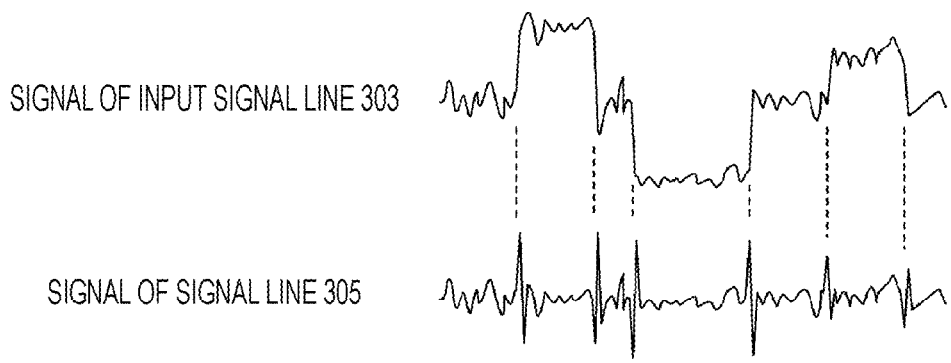
Figure 6:
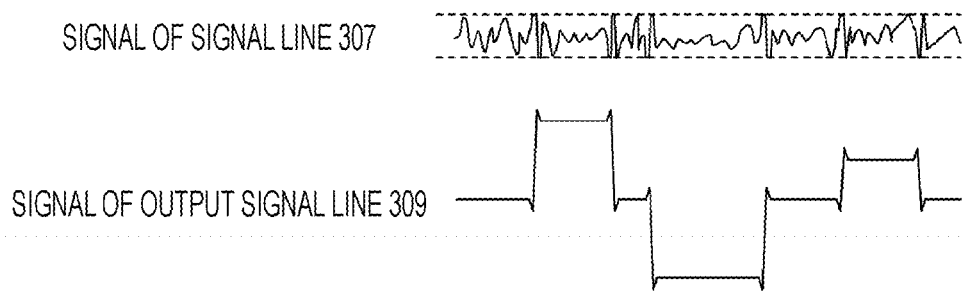

FIG. 6 is a view illustrating the two-dimensional noise reduction processing in the first embodiment of the present technology. In this drawing, a case where an epsilon filter is used is illustrated as the two-dimensional noise reduction processing. A block diagram of the two-dimensional noise reduction processing is illustrated in a of this drawing. Meanwhile, the Y signal is input to an input signal line 303. When the input signal is allowed to pass through a high-pass filter 304 and an epsilon filter 306, the high-frequency component is separated from the input signal. Meanwhile, the epsilon filter 306 is the filter which removes a signal over a predetermined level from the input signal. Next, a subtracter 308 subtracts the separated high-frequency component from the input signal. With this arrangement, the noise is removed.

This state is illustrated in b of this drawing. Meanwhile, signal lines 305 and 307 are the signal lines connected to outputs of the high-pass filter 304 and the epsilon filter 306, respectively. Also, an output signal line 309 is the signal line connected to an output of the two-dimensional noise reduction unit 364. In the two-dimensional noise reduction processing with poor noise removal ability as compared to that in three-dimensional noise reduction processing to be described later, blur in the edge portion of the image is relatively small, and this may prevent deterioration in visibility. Meanwhile, in the first embodiment of the present technology, the two-dimensional noise reduction processing other than this, for example, processing by a bilateral filter and processing by smoothing may also be used.

It is possible to make the image of the license plate area the image with improved visibility although this is the monochrome image by the edge enhancement processing and the two-dimensional noise reduction processing.

[Vehicle Body Area Image Processing Unit]

Figure 7:
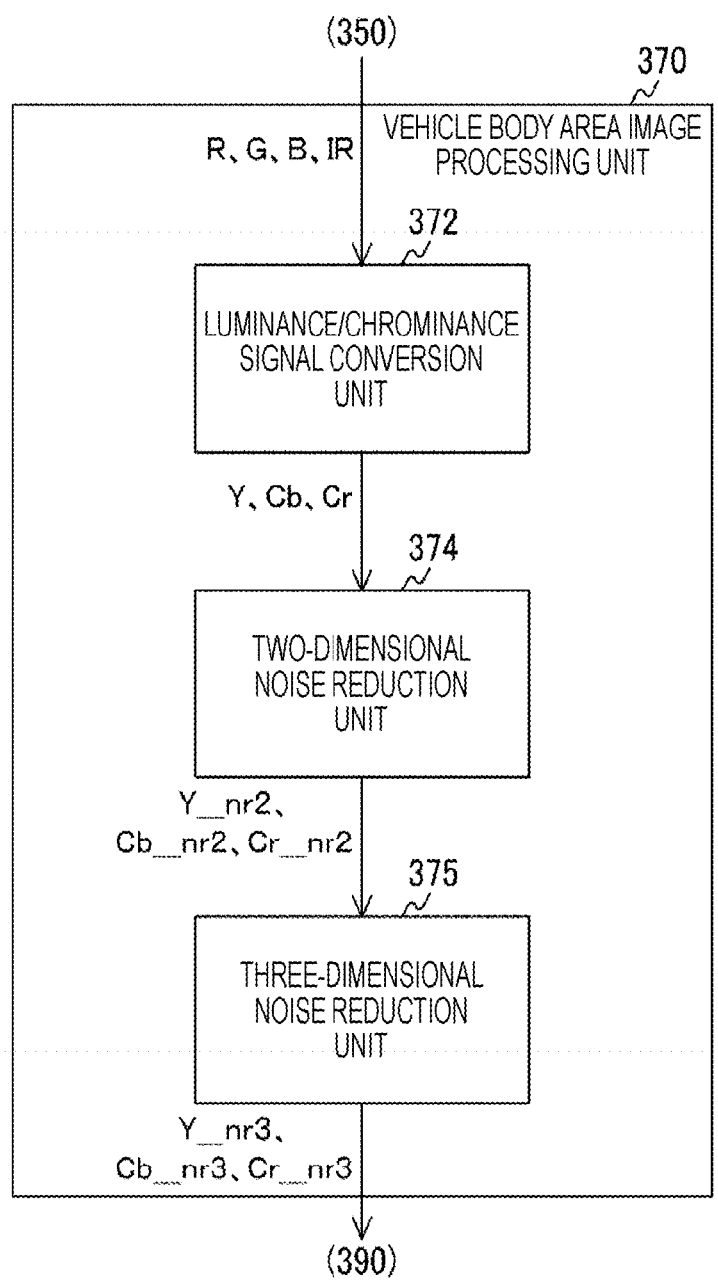
FIG. 7 is a view illustrating a configuration example of a vehicle body area image processing unit 370 in the first embodiment of the present technology.

FIG. 7 is a view illustrating a configuration example of the vehicle body area image processing unit 370 in the first embodiment of the present technology. The vehicle body area image processing unit 370 is provided with a luminance/chrominance signal conversion unit 372, a two-dimensional noise reduction unit 374, and a three-dimensional noise reduction unit 375.

The luminance/chrominance signal conversion unit 372 converts the R, G, and B signals out of the image signal corresponding to the vehicle body area to the luminance signal (Y signal) and the chrominance signal (Cb and Cr signals). Meanwhile, the Cb signal is the signal based on difference between the B signal and the Y signal and the Cr signal is the signal based on difference between the R signal and the Y signal. The conversion may be performed as represented by the following equations.

$Y=0.2990 \times R+0.5870 \times G+0.1140 \times B$ $Cb=-0.1690 \times R-0.3316 \times G+0.5000 \times B$ $Cr=0.5000 \times R-0.4186 \times G-0.0813 \times B$ The two-dimensional noise reduction unit 374 performs the above-described two-dimensional noise reduction processing. The two-dimensional noise reduction unit 374 performs the two-dimensional noise reduction processing on the Y, Cb, and Cr signals output from the luminance/chrominance signal conversion unit 372. Meanwhile, Y_nr2, Cb_nr2, and Cr_nr2 signals in this drawing represent the Y, Cb, and Cr signals on which the two-dimensional noise reduction processing is performed, respectively.

The three-dimensional noise reduction unit 375 performs the three-dimensional noise reduction processing. The three-dimensional noise reduction unit 375 performs the three-dimensional noise reduction processing on the Y_nr2, Cb_nr2, and Cr_nr2 signals output from the two-dimensional noise reduction unit 374. The three-dimensional noise reduction processing is the processing to remove the noise by using the image signals belonging to a plurality of continuous frames. Meanwhile, Y_nr3, Cb_nr3, and Cr_nr3 signals in this drawing represent the Y, Cb, and Cr signals on which the three-dimensional noise reduction processing is performed, respectively.

[Three-Dimensional Noise Reduction Processing]

Figure 8:
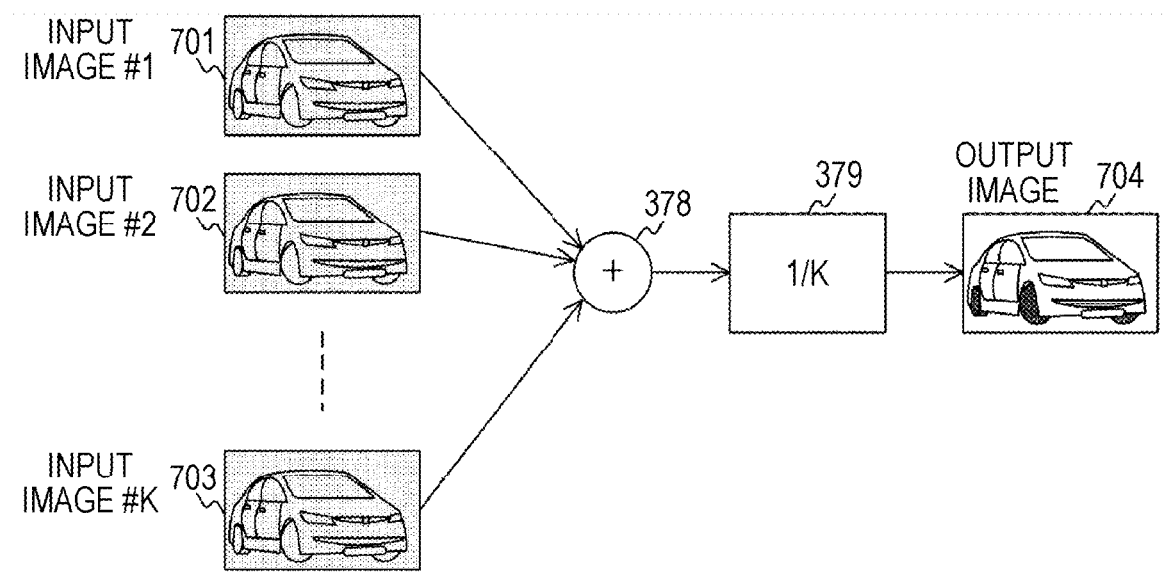
FIG. 8 is a view illustrating three-dimensional noise reduction processing in the first embodiment of the present technology.

FIG. 8 is a view illustrating the three-dimensional noise reduction processing in the first embodiment of the present technology. Images 701 to 703 in this drawing are the images corresponding to the vehicle body area. As illustrated in this drawing, the image signals of the images corresponding to the vehicle body area of K continuous frames are added by an adder 378. Thereafter, this is divided by K being the number of added image signals by a divider 379 and an output image 704 is generated. With this arrangement, it is possible to average randomly generated noise components to perform noise reduction. The three-dimensional noise reduction processing has a characteristic in which a noise removal effect increases as the number of image signals to be added K is larger, so that this may have the noise removal ability more excellent than that of the two-dimensional noise reduction processing. On the other hand, as the number of image signals to be added K is larger, the image is equalized and an image quality is problematically deteriorated; for example, the image is blurred. However, as for the vehicle body area, certain deterioration in image quality is allowed as long as the color may be reproduced, so that this is not problematic.

Also in a case where the three-dimensional noise reduction processing is performed on the image with motion, the image quality is similarly deteriorated. Therefore, it is possible to prevent the deterioration in image quality by compensating the motion of the vehicle body and performing the above-described addition. As for the motion compensation, a well-known method, for example, a motion compensating method used in the MPEG may be used.

It is possible to make the image of the vehicle body area the image with improved color reproducibility by the two-dimensional noise reduction processing and the three-dimensional noise reduction processing.

[Synthesis Processing]

Figure 9:
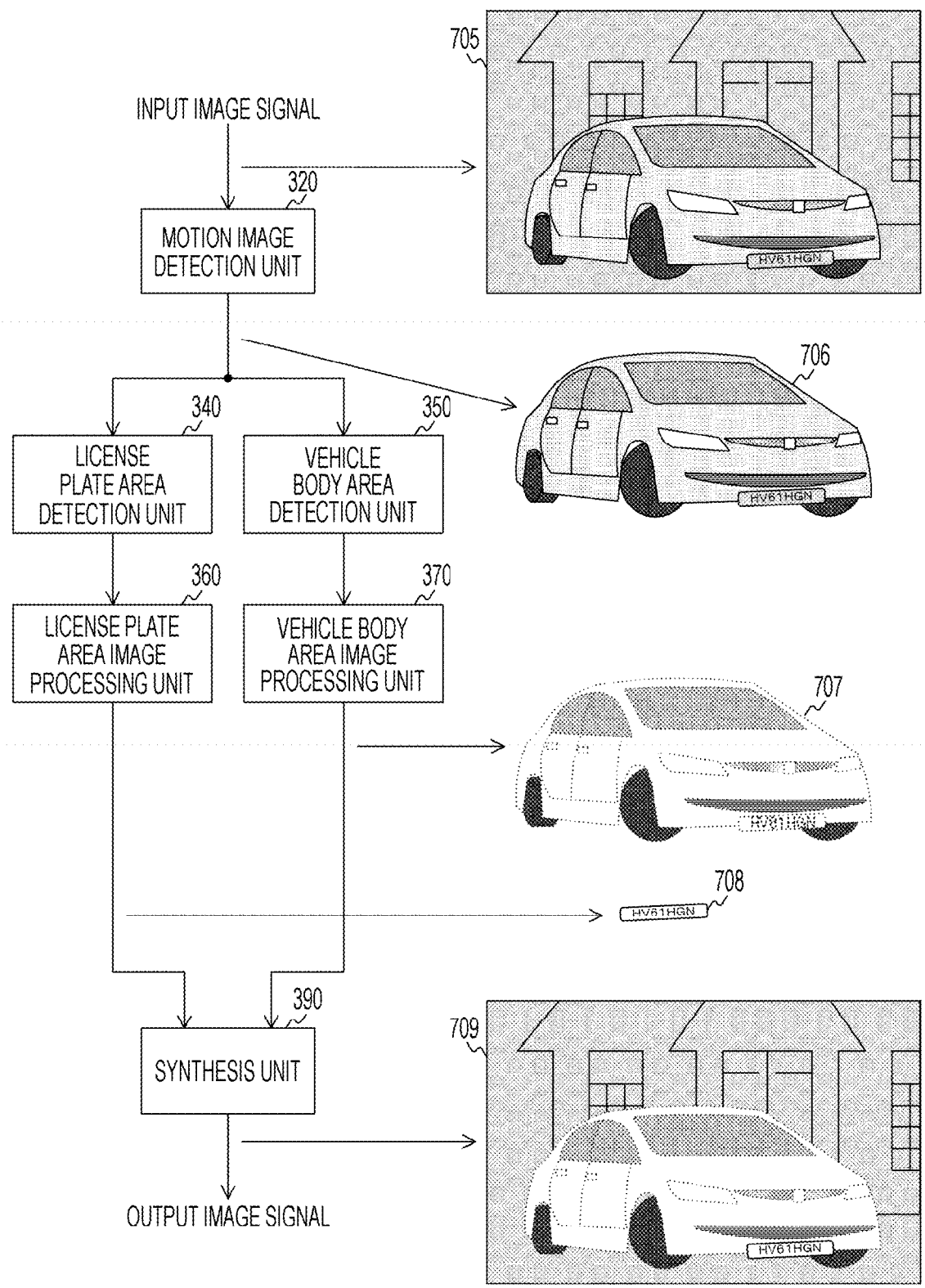
FIG. 9 is a view illustrating synthesis processing in the first embodiment of the present technology.

FIG. 9 is a view illustrating synthesis processing in the first embodiment of the present technology. A state of the image signal in each unit of the image processing device 300 and the synthesis processing by the synthesis unit 390 are illustrated in this drawing. The image signal forming an image 705 including the vehicle is input to the motion image detection unit 320 and the image signal corresponding to an image with motion 706 is output. The image signal is processed by the vehicle body area detection unit 350 and the vehicle body area image processing unit 370 to be the image signal corresponding to an image 707 in which the color reproducibility of the vehicle body is improved. In parallel to this, the image signal corresponding to the image with motion 706 is processed by the license plate area detection unit 340 and the license plate area image processing unit 360 to be the image signal corresponding to an image 708 in which the visibility of the license plate is improved.

The two image signals are synthesized by the synthesis unit 390 to be output. Meanwhile, an image 709 is the synthesized image. The synthesis by the synthesis unit 390 may be performed in the following manner, for example. The input image 705 is made a background image and the image of the vehicle body area 707 and the image of the license plate area 708 are superimposed on the image and the image 709 is synthesized. With this arrangement, the image in which the color reproducibility is improved regarding the vehicle body area and the image in which the visibility is improved regarding the license plate area are displayed as the same image. Meanwhile, in a case where the license plate area is not detected by the license plate area detection unit 340, the synthesis unit 390 superimposes only the image of the vehicle body area 707 on the background image to synthesize.

[Display of Image]

Figure 10:
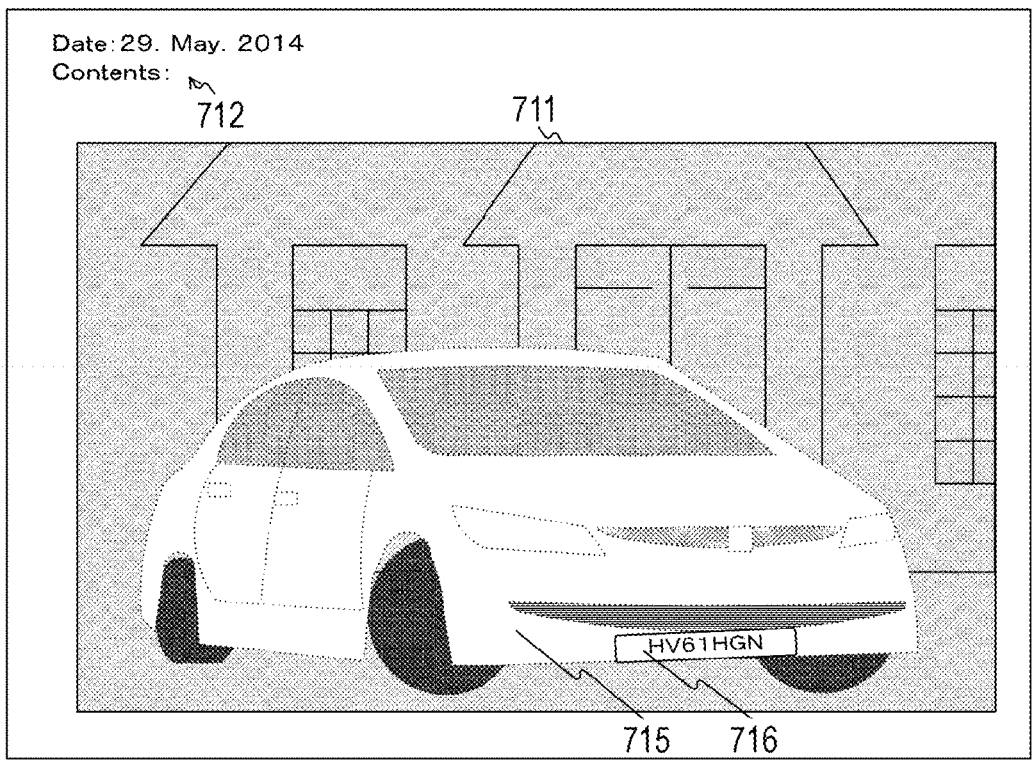
FIG. 10 is a view illustrating an image display example in the first embodiment of the present technology.
Figure 10:
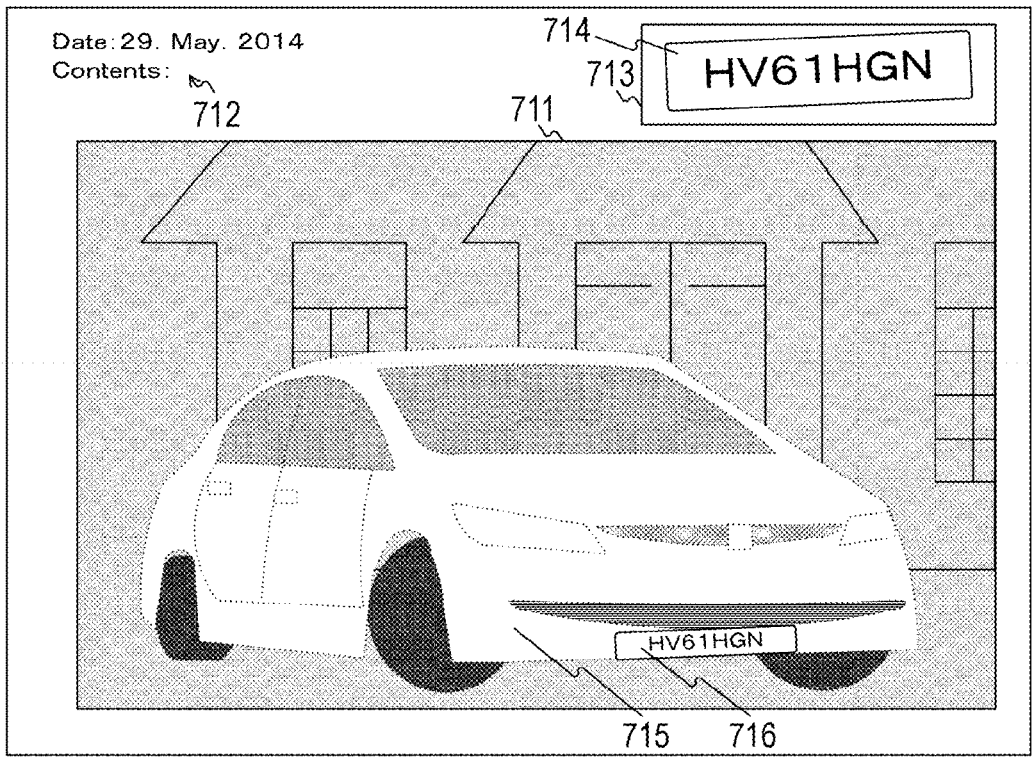

FIG. 10 is a view illustrating an image display example in the first embodiment of the present technology. An example of image display including an image display area 711 and an image information display area 712 is illustrated in a of this drawing. The image display area 711 is the area in which the image formed of the image signal output by the synthesis unit 390 is displayed and the image including an image 715 processed by the vehicle body area image processing unit 370 and an image 716 processed by the license plate area image processing unit 360 is displayed. The image information display area 712 is an area in which information such as date is displayed. An example of display obtained by further adding a license plate display area 713 to the display in a of this drawing is illustrated in b of this drawing. An image 714 obtained by enlarging the image 716 is displayed on the license plate display area 713. Therefore, in the display in b of this drawing, a character string of the license plate is easily read.

[Image Processing Procedure]

Figure 11:
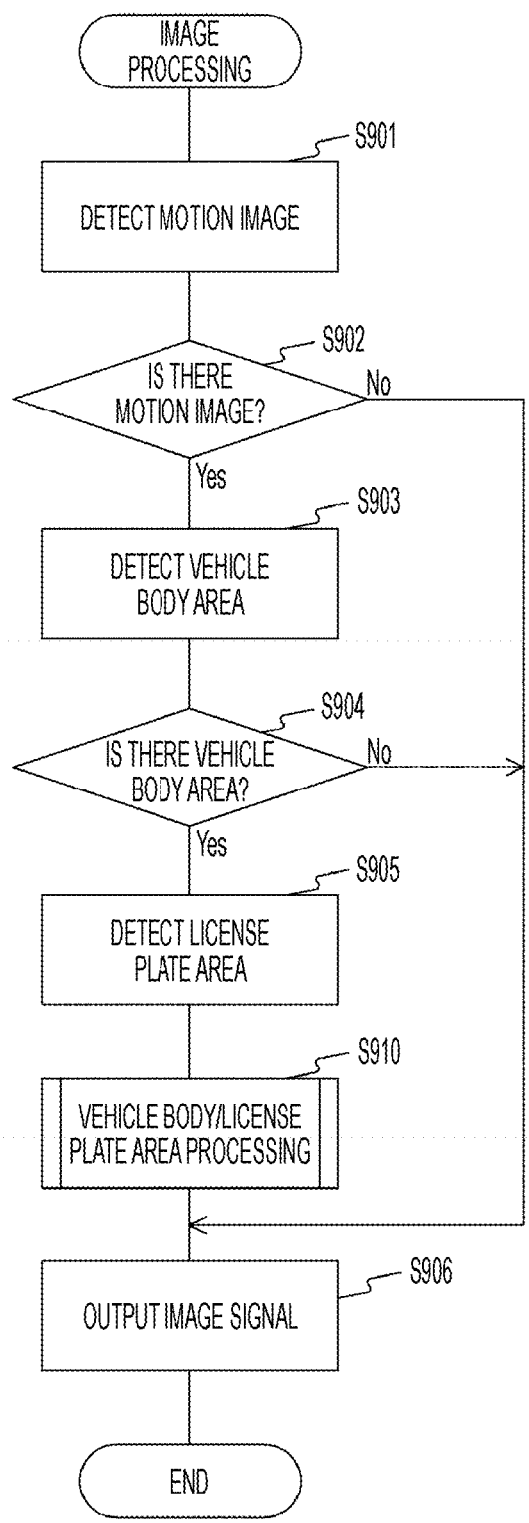
FIG. 11 is a view illustrating an example of an image processing procedure in the first embodiment of the present technology.

FIG. 11 is a view illustrating an example of an image processing procedure in the first embodiment of the present technology. When receiving the image signal of one frame input from the image sensor 200, the image processing device 300 starts this processing. First, the motion image detection unit 320 detects the image area with motion from the input image signal (step S901). At that time, in a case where the image area with motion is not detected (step S902: No), the image processing device 300 shifts to processing at step S906 and outputs the input image signal to the image signal output unit 400 (step S906).

On the other hand, in a case where the image area with motion is detected (step S902: Yes), the vehicle body area detection unit 350 detects the vehicle body area (step S903). At that time, in a case where the vehicle body area is not detected (step S904: No), the image processing device 300 shifts to the processing at step S906 and outputs the input image signal to the image signal output unit 400 (step S906).

On the other hand, in a case where the vehicle body area is detected (step S904: Yes), the license plate area detection unit 340 detects the license plate area (step S905). Next, the image processing device 300 performs vehicle body/license plate area processing (step S910) and shifts to the processing at step S906. At step S906, the image processing device 300 outputs the image obtained at step S910 to the image signal output unit 400 (step S906). Thereafter, the image processing device 300 finishes the image processing.

[Vehicle Body/License Plate Area Processing]

Figure 12:
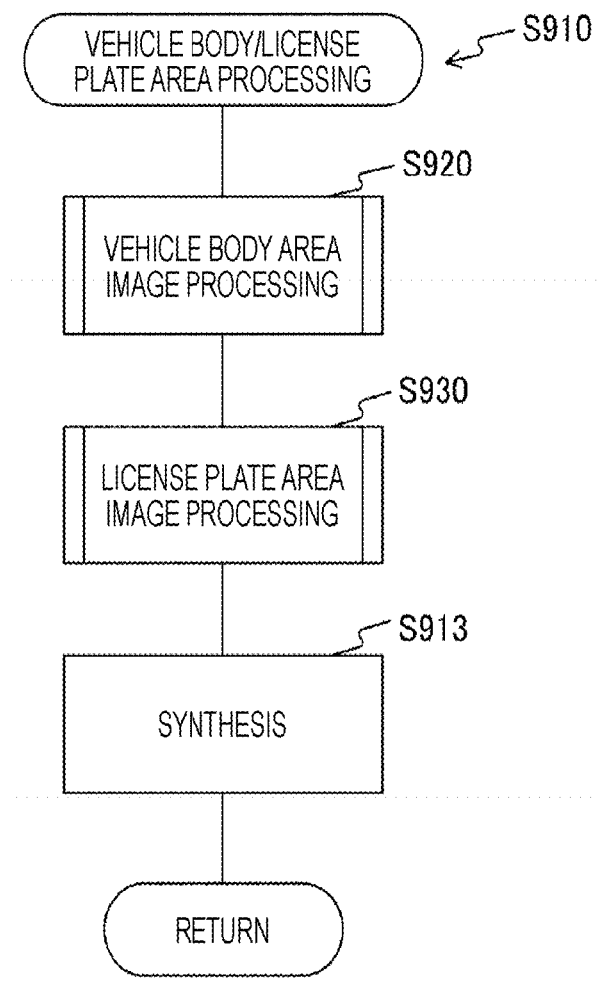
FIG. 12 is a view illustrating an example of a procedure of vehicle body/license plate area processing in the first embodiment of the present technology.

FIG. 12 is a view illustrating an example of a procedure of the vehicle body/license plate area processing in the first embodiment of the present technology. The processing in this drawing is the processing corresponding to step S910 illustrated in FIG. 11. First, the vehicle body area image processing unit 370 performs the vehicle body area image processing (step S920). Next, the license plate area image processing unit 360 performs the license plate area image processing (step S930). Next, the synthesis unit 390 synthesizes the images processed by the vehicle body area image processing and the license plate area image processing (step S913). At that time, in a case where the license plate area is not detected by the license plate area detection unit 340, the synthesis unit 390 synthesizes by using the image processed by the vehicle body area image processing. Thereafter, the image processing device 300 finishes the vehicle body/license plate area processing.

[Vehicle Body Area Image Processing]

Figure 13:
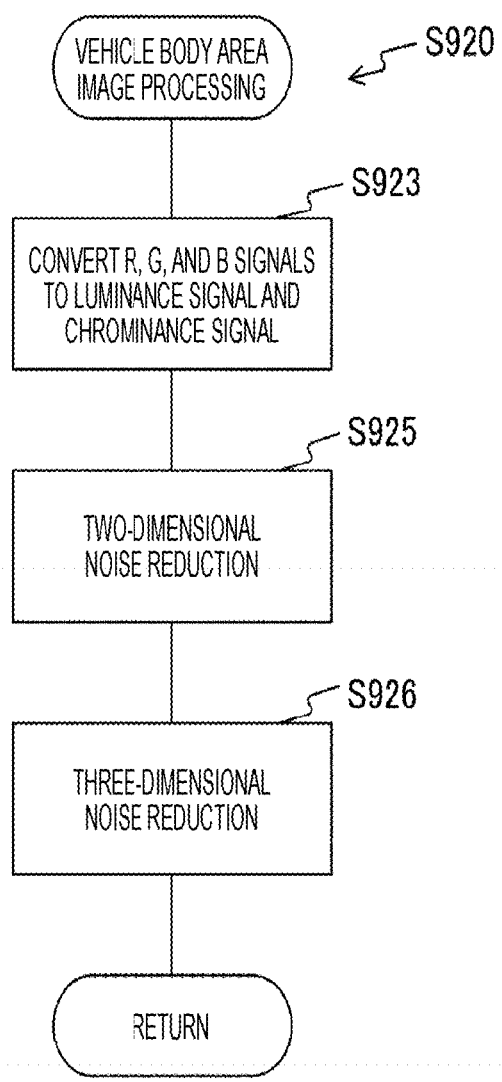
FIG. 13 is a view illustrating an example of a procedure of vehicle body area image processing in the first embodiment of the present technology.

FIG. 13 is a view illustrating an example of a procedure of the vehicle body area image processing in the first embodiment of the present technology. The processing in this drawing is the processing corresponding to step S920 illustrated in FIG. 12. First, the vehicle body area image processing unit 370 converts the R, G, and B signals to the luminance signal and the chrominance signal (step S923). Next, the vehicle body area image processing unit 370 performs the two-dimensional noise reduction processing (step S925). Next, the vehicle body area image processing unit 370 performs the three-dimensional noise reduction processing (step S926) and finishes the vehicle body area image processing.

[License Plate Area Image Processing]

Figure 14:
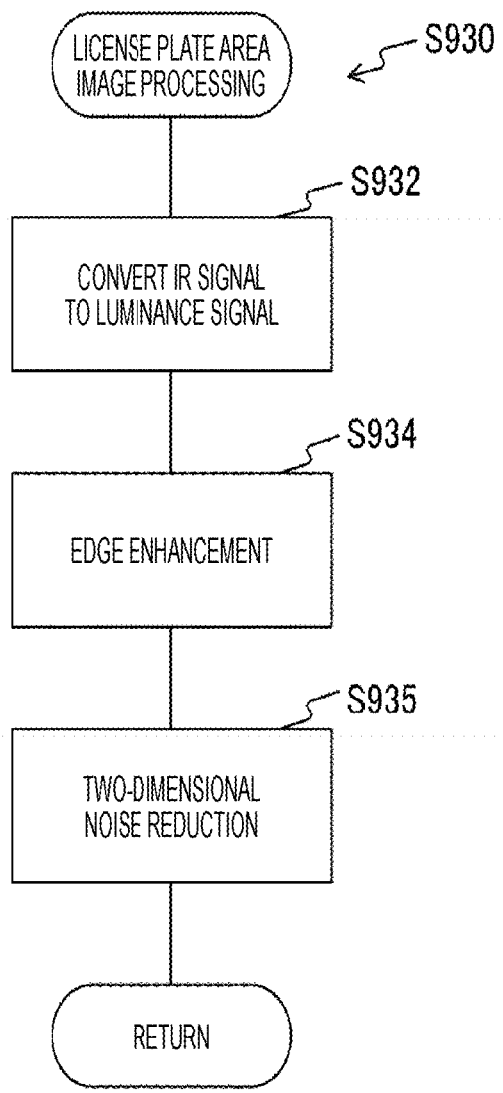
FIG. 14 is a view illustrating an example of a procedure of license plate area image processing in the first embodiment of the present technology.

FIG. 14 is a view illustrating an example of a procedure of the license plate area image processing in the first embodiment of the present technology. The processing in this drawing is the processing corresponding to step S930 illustrated in FIG. 12. First, the license plate area image processing unit 360 converts the IR signal to the luminance signal (step S932). Next, the license plate area image processing unit 360 performs the edge enhancement processing (step S934). Next, the license plate area image processing unit 360 performs the two-dimensional noise reduction processing (step S935) and finishes the license plate area image processing.

In this manner, according to the first embodiment of the present technology, it is possible to improve the visibility of the license plate and the color reproducibility of the vehicle body, so that the vehicle to be monitored may be easily specified. Also, it is possible to form the imaging device 10 of a signal image sensor by using the image sensor 200 corresponding to both the visible light and the infrared light and separately processing the visible light signal and the infrared light signal. With this arrangement, the configuration of the imaging device 10 may be simplified.

[Variation]

A license plate area detection unit 340 detects a license plate area from an image signal processed by a demosaicing unit 330 in the above-described embodiment. On the other hand, it is also possible to detect the license plate area from the image signal corresponding to a vehicle body area detected by a vehicle body area detection unit 350. This is because the license plate area is included in the vehicle body area. With this arrangement, an area of the image to be processed by the license plate area detection unit 340 is limited and processing time may be shortened.

2. Second Embodiment

An image of a license plate area is processed by using an IR signal in the above-described embodiment. On the other hand, in a second embodiment of the present technology, when the IR signal is saturated, the image of the license plate area is processed by using visible light signals (R, G, and B signals).

[Configuration of Image Processing Device]

Figure 15:
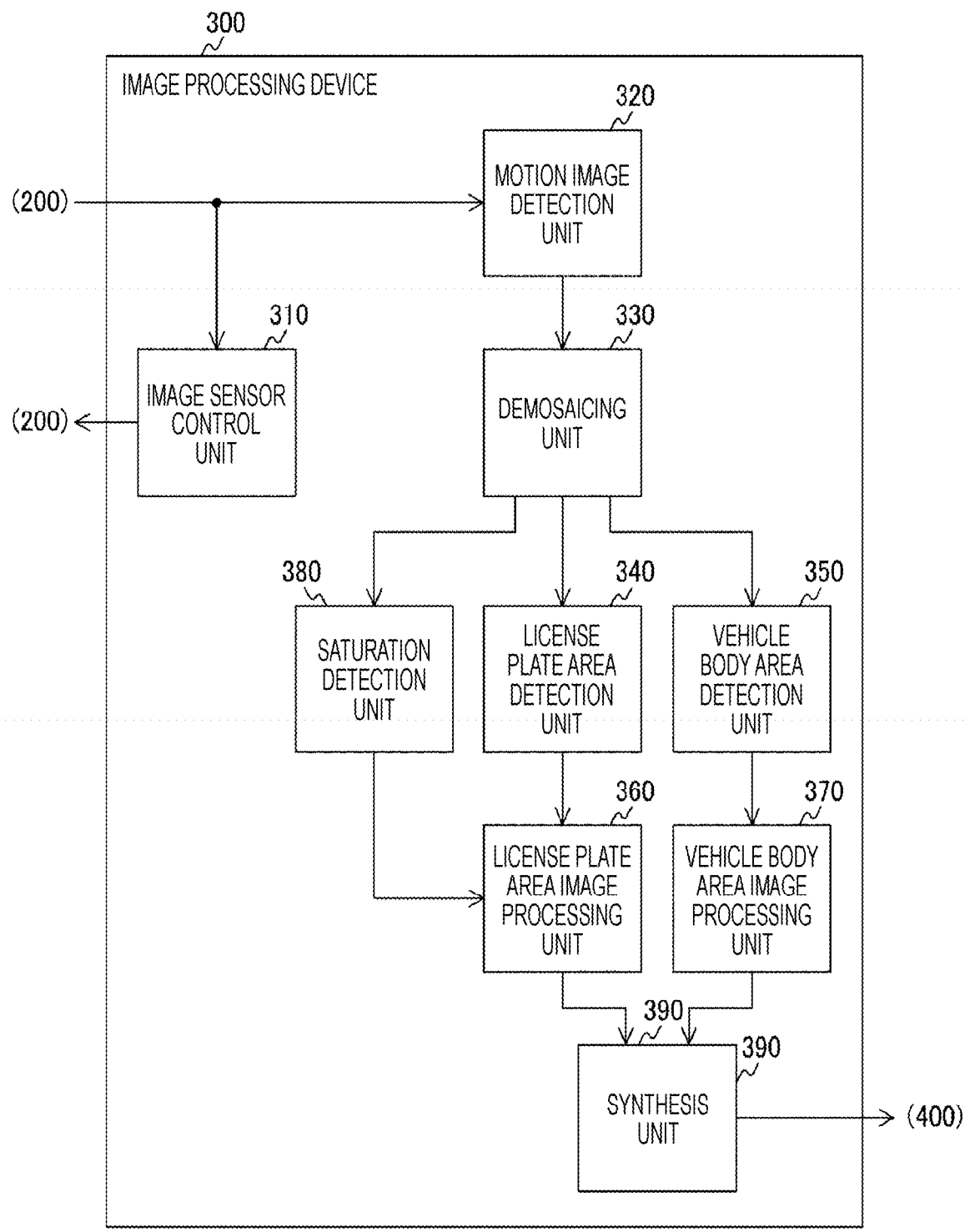
FIG. 15 is a view illustrating a configuration example of an image processing device 300 in a second embodiment of the present technology.

FIG. 15 is a view illustrating a configuration example of an image processing device 300 in the second embodiment of the present technology. The image processing device 300 in this drawing is different from the image processing device 300 illustrated in FIG. 3 in that this is further provided with a saturation detection unit 380.

Also, it is required to use an image sensor including pixels corresponding to red light, green light, blue light and infrared light as an image sensor 200 in the second embodiment of the present technology. Furthermore, it is required that the pixel corresponding to the red light, the green light, or the blue light is provided with a color filter which removes the infrared light. That is to say, it is required to use the image sensor having an array illustrated in a to c of FIG. 2 out of the image sensors illustrated in FIG. 2. Furthermore, it is required to use the image sensor in which the pixels assigned with R+IR, G+IR, and B+IR are configured to detect the red light, the green light, and the blue light, respectively, and not to detect an infrared light component. This is because the R+IR pixel, the G+IR pixel, and the B+IR pixel of the image sensor illustrated in FIG. 2 also have sensitivity for the infrared light component, so that the image signals output from all the pixels including the IR pixel are saturated when excessive infrared light enters.

The image signal output by the image sensor 200 in the second embodiment of the present technology includes the R signal, the G signal, the B signal, and the IR signal, so that a demosaicing unit 330 may omit infrared component removal processing described above. The configurations of the imaging device 10 and the image processing device 300 other than this are similar to those of the imaging device 10 and the image processing device 300 described in the first embodiment of the present technology, so that the description thereof is omitted.

The saturation detection unit 380 detects whether the IR signal is saturated. Since an image sensor control unit 310 controls exposure in the above-described manner, the IR signal is not saturated in general. However, when shooting while an infrared light emission unit 500 emits the infrared light, if a distance between a vehicle being an object and the imaging device 10 is short, the IR signal is temporarily saturated. In such a case also, it is possible to obtain the image signal in a state in which the IR signal is not saturated by the exposure control by the image sensor control unit 310. However, in a case where the vehicle approaches at a high speed, the exposure control by the image sensor control unit 310 cannot follow this and only the image signal in a state in which the IR signal is saturated is obtained. In such a case, the saturation detection unit 380 detects the saturation of the IR signal.

The license plate area image processing unit 360 in the second embodiment of the present technology performs image processing of the license plate area on the basis of a result of the detection by the saturation detection unit 380.

[Configuration of License Plate Area Image Processing Unit]

Figure 16:
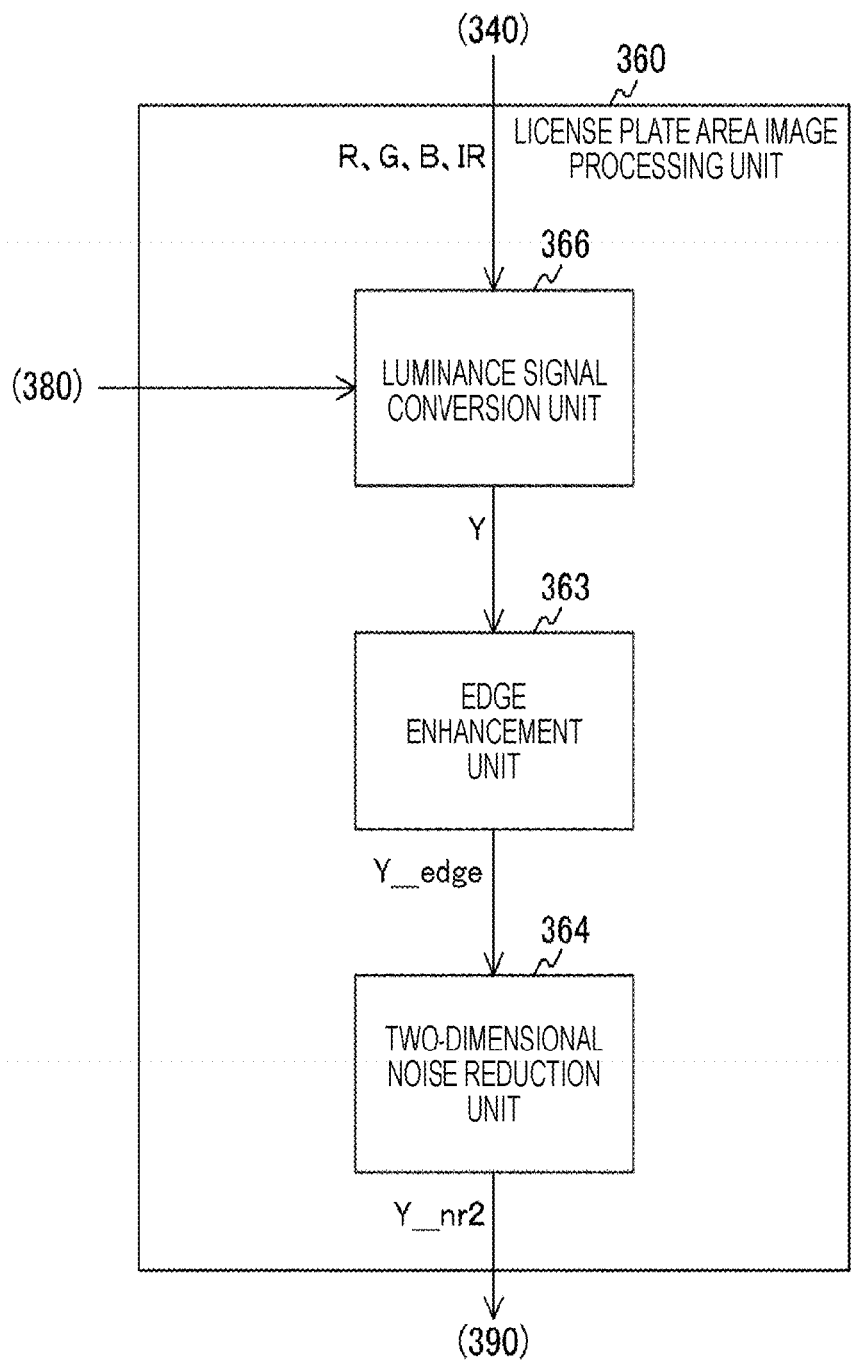
FIG. 16 is a view illustrating a configuration example of a license plate area image processing unit 360 in the second embodiment of the present technology.

FIG. 16 is a view illustrating a configuration example of a license plate area image processing unit 360 in the second embodiment of the present technology. The license plate area image processing unit 360 is different from the license plate area image processing unit 360 illustrated in FIG. 5 in that this is provided with a luminance signal conversion unit 366 in place of a luminance signal conversion unit 362.

The luminance signal conversion unit 366 converts the R signal, the G signal, the B signal, and the IR signal to a Y signal. At that time, different conversion is performed on the basis of the result of the detection by the saturation detection unit 380. The conversion may be performed as follows.

(a) When the saturation of the IR signal is detected by the saturation detection unit 380.

The conversion is performed as represented by the following equation by using the R signal, the G signal, and the B signal.

$$Y = 0.2990 \times R + 0.5870 \times G + 0.1140 \times B$$

(b) When the saturation of the IR signal is not detected by the saturation detection unit 380.

The conversion is performed as represented by the following equation by using the IR signal.

$$Y = IR$$

In this manner, the luminance signal conversion unit 366 different from the luminance signal conversion unit 362 illustrated in FIG. 5 converts the R signal, the G signal, and the B signal to the Y signal when the IR signal is saturated. Therefore, it is possible to prevent halation of a display of a license plate area in a case where the IR signal is saturated. With this arrangement, it is possible to improve visibility of the license plate.

[License Plate Area Image Processing]

Figure 17:
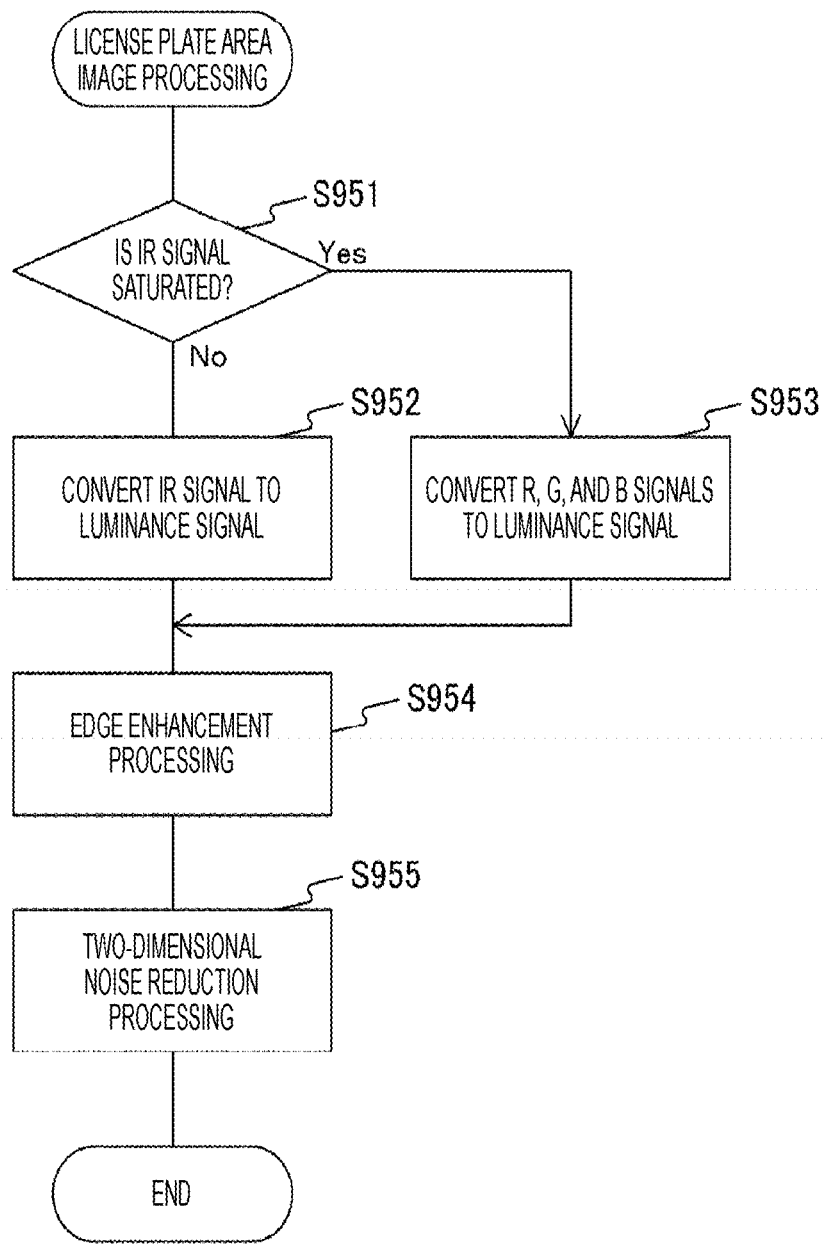
FIG. 17 is a view illustrating an example of a procedure of license plate area image processing in the second embodiment of the present technology.

FIG. 17 is a view illustrating an example of a procedure of a license plate area image processing in the second embodiment of the present technology. The processing in the drawing is the processing corresponding to the license plate area image processing illustrated in FIG. 12. Meanwhile, the procedure of the image processing other than this is similar to the procedure described in the first embodiment of the present technology, so that the description thereof is omitted.

First, the license plate area image processing unit 360 determines whether the IR signal is saturated (step S951). Specifically, this determines whether the saturation detection unit 380 detects the saturation of the IR signal. In a case where the IR signal is not saturated (step S951: No), the license plate area image processing unit 360 converts the IR signal to the luminance signal (step S952) and shifts to processing at step S954. On the other hand, in a case where the IR signal is saturated (step S951: Yes), the license plate area image processing unit 360 converts the R signal, the G signal, and the B signal to the luminance signal (step S953) and shifts to the processing at step S954. At step S954, the license plate area image processing unit 360 performs edge enhancement processing (step S954). Next, the license plate area image processing unit 360 performs the two-dimensional noise reduction processing (step S955) and finishes the license plate area image processing.

In this manner, according to the second embodiment of the present technology, it is possible to prevent deterioration in visibility of a license plate in a case where the IR signal is saturated.

[Variation]

In the above-described second embodiment, emission of infrared light by an infrared light emission unit 500 is not controlled in a case where an IR signal is saturated. On the other hand, it is also possible that a control unit 600 controls the infrared light emission unit 500 to decrease an emission amount of the infrared light when a saturation detection unit 380 of an image processing device 300 detects saturation of the IR signal. With this arrangement, an appropriate infrared light emission amount may be obtained and it is possible to prevent deterioration in visibility of a license plate.

3. Third Embodiment

In the above-described embodiment, an image of a license plate area is superimposed on an image of a vehicle body area to synthesize. On the other hand, in a third embodiment of the present technology, superimposition of the image of the license plate area on the image of the vehicle body area is omitted.

[Synthesis Processing]

Figure 18:
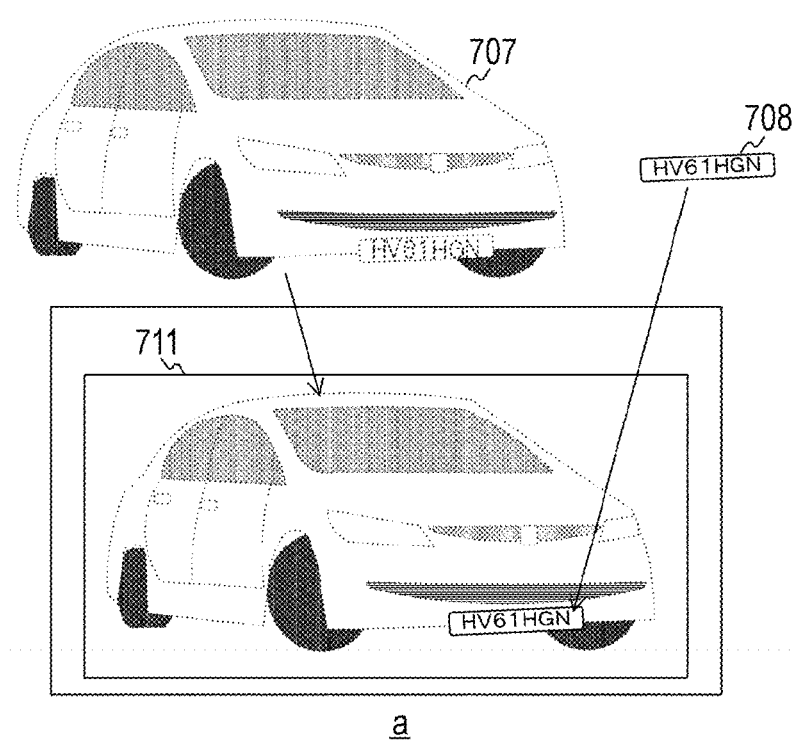
FIG. 18 is a view illustrating synthesis processing in a third embodiment of the present technology.
Figure 18:
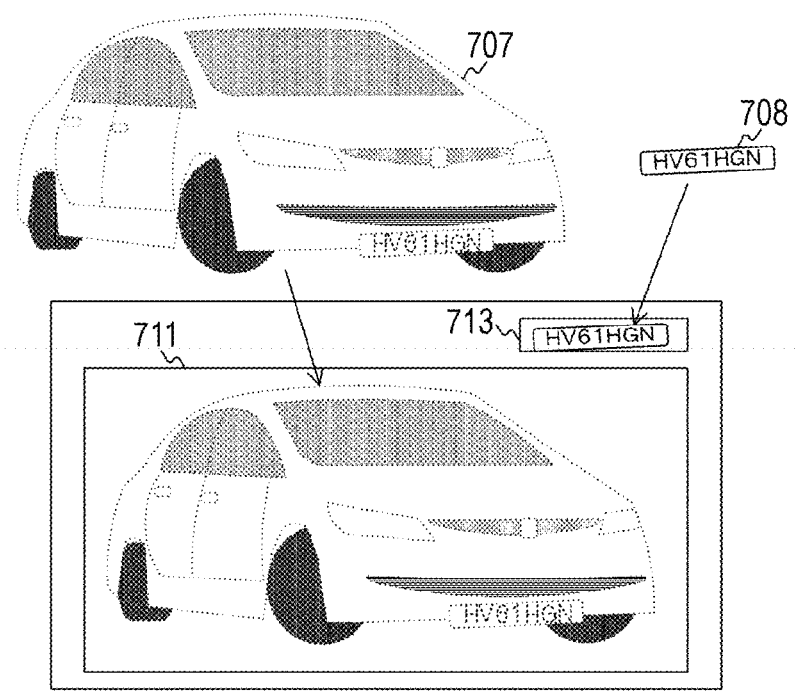

FIG. 18 is a view illustrating synthesis processing in the third embodiment of the present technology. The synthesis processing in the first embodiment of the present technology is illustrated in a of this drawing for comparison. In a of this drawing, a synthesis unit 390 superimposes an image of the license plate area 708 on an image of the vehicle body area 707 to display on an image display area 711. Therefore, a monochrome image of the license plate area is overwritten on a license plate portion of the image 707 and it is not possible to specify a color of the license plate.

The synthesis processing in the third embodiment of the present technology is illustrated in b of this drawing in which the superimposition of the image of the license plate area on the image of the vehicle body area 707 is omitted. Therefore, color reproducibility of the license plate area of the image of the vehicle body area 707 is improved as in another vehicle body area, and it is possible to specify the color of the license plate. Meanwhile, the image of the license plate area 708 is displayed on a license plate display area 713.

In this manner, according to the third embodiment of the present technology, it is possible to specify the color of the license plate together with the color of the vehicle body.

4. Fourth Embodiment

In the above-described embodiment, an image sensor 200 which does not include a pixel corresponding to white light is used. On the other hand, in the fourth embodiment of the present technology, the image sensor 200 including the pixel corresponding to the white light is used.

[Configuration of Imaging Device and Image Processing Device]

An imaging device 10 in the fourth embodiment of the present technology uses an image sensor having arrangement of pixels illustrated in d of FIG. 2 as the image sensor 200. Also, a motion image detection unit 320 and a demosaicing unit 330 of an image processing device 300 in the fourth embodiment of the present technology are required to perform processing on an image signal including a W+IR signal. A configuration of the imaging device 10 other than this is similar to that of the imaging device 10 described in the first embodiment of the present technology, so that the description thereof is omitted.

[Demosaic Processing]

Figure 19:
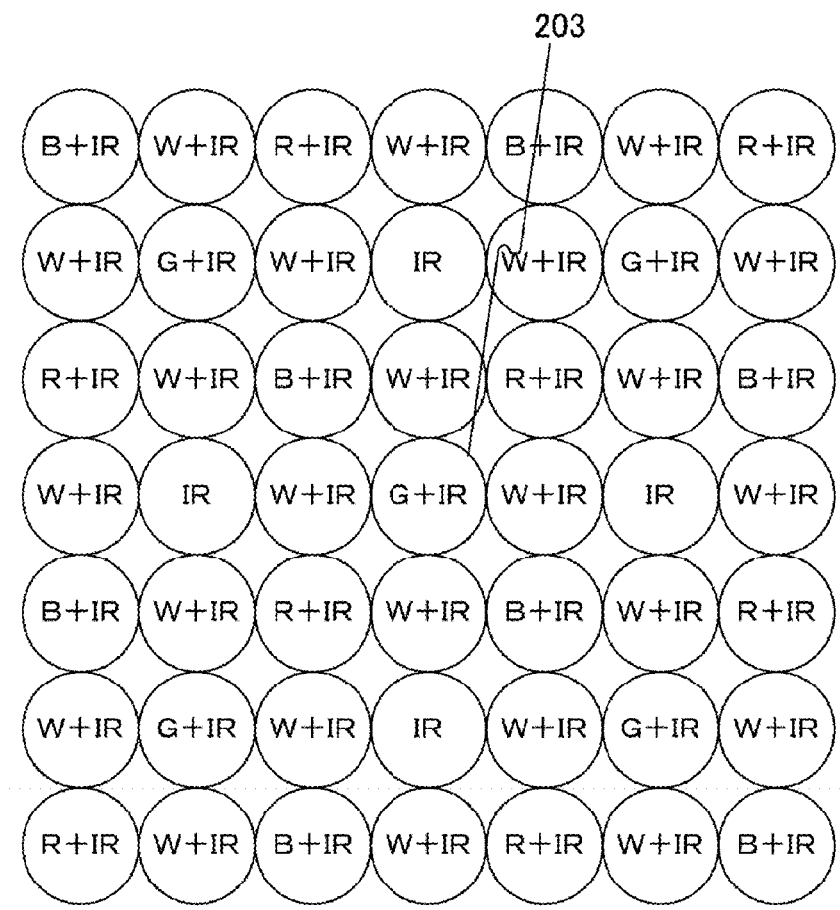
FIG. 19 is a view illustrating demosaic processing in a fourth embodiment of the present technology.
Figure 20:
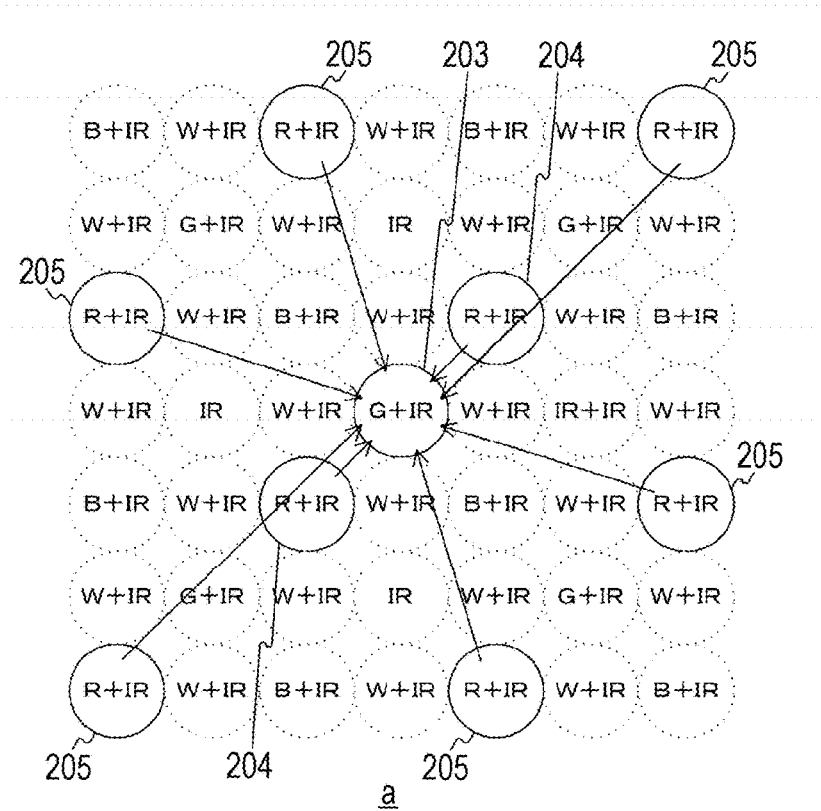
FIG. 20 is a view illustrating the demosaic processing in the fourth embodiment of the present technology.
Figure 20:
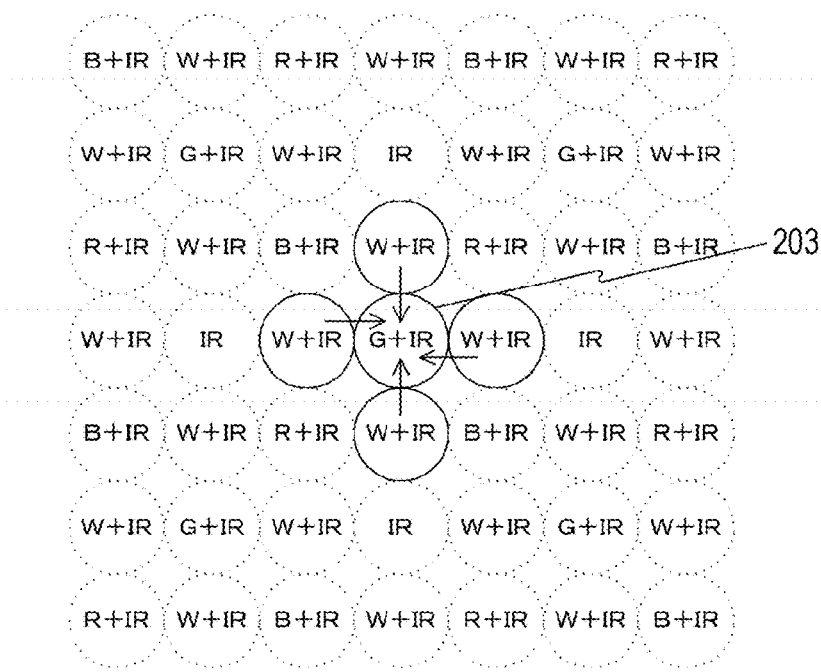

FIGS. 19 and 20 are views illustrating demosaic processing in the fourth embodiment of the present technology. FIG. 19 illustrates arrangement of pixels of the image sensor 200 and a case where a signal other than a G+IR signal is interpolated in a pixel 203 arranged on the center is supposed. An example of a case where an R+IR signal is interpolated is illustrated in a of FIG. 20. In this manner, an average value of the signals of the R+IR pixels around the pixel 203 is made the R+IR signal in the pixel 203. This average is calculated by weighted average by the R+IR signals. A predetermined weight is multiplied by each R+IR signal. The weight is larger as the pixel is closer to the pixel 203. That is to say, in a of FIG. 20, the weight larger than that of a pixel 205 arranged in a relatively distant position is set for a pixel 204 adjacent to the pixel 203.

The image signal interpolated in this manner is represented with an index "_L". That is to say, signals after the interpolation of the R+IR signal, the G+IR signal, a B+IR signal, the W+IR signal, and an IR signal are an R+IR_L signal, a G+IR_L signal, a B+IR_L signal, a W+IR_L signal, and an IR_L signal, respectively. The signals are average values of the image signals of a relatively wide range, so that they are the image signals from which a high-frequency component is lost. Therefore, when the processing is performed by using the signals, the image signal corresponding to a vehicle body area forms the image with a blurred contour.

The interpolation to generate the signal including many high-frequency components for the W+IR signal is illustrated in b of FIG. 20. The W+IR pixels more than other pixels are arranged, so that it is possible to use a method similar to an interpolating method illustrated in FIG. 4. That is to say, an average value of the signals of the W+IR pixels adjacent to the pixel 203 may be made the W+IR signal in the pixel 203. The W+IR signal interpolated in this manner is referred to as W+IR_H. The signal is the average value of the image signals of the adjacent pixels, so that this is the image signal including many high-frequency components. The W+IR signals include signals of wavelengths in a wide range from visible light to infrared light, and it is possible to restore the high-frequency component for another signal after demosaic processing by using this signal as described later.

Next, an IR signal component is removed from the R+IR_L signal, the G+IR_L signal, and the B+IR_L signal. This may be performed by subtracting the IR_L signal from the R+IR_L signal, the G+IR_L signal, and the B+IR_L as in the method described in the first embodiment of the present technology. The image signals obtained by removing the IR signal component are referred to as an R_L signal, a G_L signal, and a B_L signal.

Next, the high-frequency component of the R_L signal, the G_L signal, and the B_L signal is restored. This may be performed as represented by the following equations.

$$R = R\_L + W_{+IR}\_H \times R\_L / W_{+IR}\_L$$

$$G = G\_L + W_{+IR}\_H \times G\_L / W_{+IR}\_L$$

$$B = B\_L + W_{+IR}\_H \times B\_L / W_{+IR}\_L$$

in which, $W_{+IR}\_H$ and $W_{+IR}\_L$ represent the W+IR_H signal and the W+IR_L signal, respectively. Also, R_L, G_L, and B_L represent an R_L signal, a G_L signal, and a B_L signal, respectively. With this arrangement, it is possible to obtain an R signal, a G signal, and a B signal in which the high-frequency component is restored. Since the image signal corresponding to the vehicle body area is processed by the signals, it is possible to obtain the image signal of the vehicle body area with improved blur and visibility.

In this manner, according to the fourth embodiment of the present technology, the visibility of the vehicle body area together with color reproducibility may be improved in a case where the image sensor 200 including the image signal corresponding to the white light is used.

5. Variation

A single image sensor 200 is used in the above-described embodiment. It is also possible to use two image sensors which are the image sensor corresponding to visible light and that corresponding to infrared light. This is because an optimal exposure condition may be obtained by controlling exposure for each of the image sensor corresponding to the visible light and the image sensor corresponding to the infrared light. Meanwhile, in a variation of the embodiment of the present technology, it is required to guide incident light of an imaging device 10 to the two image sensors by a prism, a half mirror and the like.

It is also possible to provide a saturation detection unit 380 illustrated in FIG. 15 together with the two image sensors. In a case where an IR signal is saturated, it is possible to improve visibility of a license plate area by a visible light signal. Meanwhile, it is also possible to remove an effect of the infrared light by mounting an infrared cutting filter on the image sensor corresponding to the visible light.

As described above, according to the embodiment of the present technology, it becomes possible to read a license plate and obtain a color of a vehicle body by improving the visibility of the license plate and color reproducibility of the vehicle body. With this arrangement, a vehicle to be monitored may be easily specified.

Meanwhile, the above-described embodiments describe an example of embodying the present technology, and there is a correspondence relationship between matters in the embodiments and the matters specifying the invention in claims. Similarly, there is the correspondence relationship between the matters specifying the invention in claims and the matters in the embodiments of the present technology having the same name. However, the present technology is not limited to the embodiments and may be embodied with various modifications of the embodiments without departing from the spirit thereof.

The procedures described in the above-described embodiments may be considered as a method having a series of procedures and may be considered as a program for allowing a computer to execute the series of procedures or a recording medium which stores the program. A compact disc (CD), a MiniDisc (MD), a digital versatile disc (DVD), a memory card, a Blu-ray™ Disc and the like may be used, for example, as the recording medium.

Meanwhile, the effect described in this specification is illustrative only and is not limitative; there may also be another effect.

Meanwhile, the present technology may also have the following configurations.

(1) An image processing device including:

a vehicle body area detection unit which detects a vehicle body area of a vehicle from an image signal;

a license plate area detection unit which detects a license plate area of the vehicle from the image signal;

a vehicle body area image processing unit which performs processing of the image signal corresponding to the detected vehicle body area;

a license plate area image processing unit which performs processing different from the processing of the image signal corresponding to the vehicle body area on the image signal corresponding to the detected license plate area; and a synthesis unit which synthesizes the processed image signal corresponding to the vehicle body area and the processed image signal corresponding to the license plate area.

(2) The image processing device according to (1) described above, in which the license plate area image processing unit performs luminance signal conversion processing to convert the image signal corresponding to the license plate area to a luminance signal corresponding to the license plate area and edge enhancement processing to enhance an edge portion of an image in the luminance signal.

(3) The image processing device according to (1) described above, in which the license plate area image processing unit performs luminance signal conversion processing to convert the image signal corresponding to the license plate area to a luminance signal corresponding to the license plate area and two-dimensional noise reduction processing to remove noise of the luminance signal by attenuating high-frequency components of luminance signals belonging to the same frame.

(4) The image processing device according to (1) described above, in which the vehicle body area image processing unit performs luminance/chrominance signal conversion processing to convert the image signal corresponding to the vehicle body area to a luminance signal and a chrominance signal corresponding to the vehicle body area and three-dimensional noise reduction processing to remove noise of the luminance signal and the chrominance signal by using luminance signals and chrominance signals belonging to a plurality of continuous frames.

(5) The image processing device according to (1) to (4) described above, in which the image signal includes image signals corresponding to red light, green light, blue light, and infrared light, the vehicle body area image processing unit performs processing of the image signals corresponding to the red light, the green light, and the blue light included in the image signal corresponding to the vehicle body area, and the license plate area image processing unit performs processing of an image signal corresponding to the infrared light included in the image signal corresponding to the license plate area.

(6) The image processing device according to (5) described above, in which the image signal further includes an image signal corresponding to white light, and the vehicle body area image processing unit performs processing of the image signals corresponding to the red light, the green light, the blue light, and the white light included in the image signal corresponding to the vehicle body area.

(7) The image processing device according to (1) described above, in which the image signal includes image signals corresponding to red light, green light, blue light, and infrared light, the image processing device further including a saturation detection unit which detects whether an image signal corresponding to the infrared light included in the image signal is saturated, and the license plate area image processing unit performs processing of the image signal corresponding to the infrared light included in the image signal corresponding to the license plate area in a case where the saturation detection unit detects that the image signal corresponding to the infrared light is not saturated and performs processing of the image signals corresponding to the red light, the green light, and the blue light included in the image signal corresponding to the license plate area in a case where the saturation detection unit detects that the image signal corresponding to the infrared light is saturated.

(8) An imaging device including:
an image sensor which generates an image signal;
a vehicle body area detection unit which detects a vehicle body area of a vehicle from the image signal;
a license plate area detection unit which detects a license plate area of the vehicle from the image signal;
a vehicle body area image processing unit which performs processing of the image signal corresponding to the detected vehicle body area;
a license plate area image processing unit which performs processing different from the processing of the image signal corresponding to the vehicle body area on the image signal corresponding to the detected license plate area; and
a synthesis unit which synthesizes the processed image signal corresponding to the vehicle body area and the processed image signal corresponding to the license plate area.

(9) An image processing method including:
a vehicle body area detecting procedure to detect a vehicle body area of a vehicle from an image signal;
a license plate area detecting procedure to detect a license plate area of the vehicle from the image signal;
a vehicle body area image processing procedure to perform processing of the image signal corresponding to the detected vehicle body area;
a license plate area image processing procedure to perform processing different from the processing of the image signal corresponding to the vehicle body area on the image signal corresponding to the detected license plate area; and
a synthesis procedure to synthesize the processed image signal corresponding to the vehicle body area and the processed image signal corresponding to the license plate area.

REFERENCE SIGNS LIST

10 Imaging device
100 Lens
200 Image sensor
201 to 205 Pixel
300 Image processing device
304 High-pass filter
306 Epsilon filter
308 Subtracter
310 Image sensor control unit
320 Motion image detection unit
330 Demosaicing unit
340 License plate area detection unit
350 Vehicle body area detection unit
360 License plate area image processing unit
362, 366 Luminance signal conversion unit
363 Edge enhancement unit
364, 374 Two-dimensional noise reduction unit
370 Vehicle body area image processing unit
372 Luminance/chrominance signal conversion unit
375 Three-dimensional noise reduction unit
378 Adder
379 Divider
380 Saturation detection unit
390 Synthesis unit
400 Image signal output unit
500 Infrared light emission unit
600 Control unit

The invention claimed is:

1. An image processing device comprising:
a vehicle body area detector configured to perform object motion detection to detect a first portion of an image signal, the first portion of the image signal corresponding to a vehicle body area of an image;
a license plate area detector configured to detect a second portion of the image signal, the second portion of the image signal corresponding to a license plate area of the image;
a processor configured to perform a first processing on the first portion of the image signal corresponding to the vehicle body area to modify first pixels corresponding to the vehicle body area of the image, and to perform a second processing on the second portion of the image signal corresponding to the license plate area to modify second pixels corresponding to the license plate area of the image, the first processing being different from the second processing; and
a synthesizer configured to synthesize a processed image signal corresponding to the vehicle body area modified by the first processing and a processed image signal corresponding to the license plate area modified by the second processing.

2. The image processing device according to claim 1, wherein the second processing includes luminance signal conversion processing to convert the second portion of the image signal corresponding to the license plate area to a luminance signal corresponding to the license plate area.

3. The image processing device according to claim 2, wherein the second processing includes edge enhancement processing to enhance an edge portion of the luminance signal corresponding to the license plate area.

4. The image processing device according to claim 2, wherein the second processing includes two-dimensional noise reduction processing to remove noise in the luminance signal corresponding to the license plate area by attenuating high-frequency components of luminance signals belonging to a same frame.

5. The image processing device according to claim 1, wherein
the image signal includes image signals corresponding to red light, green light, blue light, and infrared light,
the first processing includes processing of the image signals corresponding to the red light, the green light, and the blue light included in the first portion of the image signal corresponding to the vehicle body area, and
the second processing includes processing of the image signal corresponding to the infrared light included in the second portion of the image signal corresponding to the license plate area.

6. The image processing device according to claim 5, wherein
the image signal further includes an image signal corresponding to white light, and
the first processing includes processing of the image signals corresponding to the red light, the green light, the blue light, and the white light included in the first portion of the image signal corresponding to the vehicle body area.

7. The image processing device according to claim 1, wherein
the image signal includes image signals corresponding to red light, green light, blue light, and infrared light,
the image processing device further comprises a saturation detector configured to detect whether the image signal corresponding to the infrared light included in the image signal is saturated, and the second processing includes: (i) processing of the image signal corresponding to the infrared light included in the second portion of the image signal corresponding to the license plate area in a case where the saturation detector detects that the image signal corresponding to the infrared light is not saturated, and (ii) processing of the image signals corresponding to the red light, the green light, and the blue light included in second portion of the image signal corresponding to the license plate area in a case where the saturation detector detects that the image signal corresponding to the infrared light is saturated.

8. The image processing device according to claim 1, wherein any combination of the vehicle body area detector, the license plate area detector, and the processor is implemented using hardware.

9. The image processing device according to claim 1,
wherein the image processing device further comprises a microcomputer coupled to a digital signal processor (DSP), and
wherein any combination of the vehicle body area detector, the license plate area detector, and the processor is implemented using software executable by the microcomputer.

10. An image processing device comprising:
a vehicle body area detector configured to perform object motion detection to detect a first portion of an image signal, the first portion of the image signal corresponding to a vehicle body area of an image;
a license plate area detector configured to detect a second portion of the image signal, the second portion of the image signal corresponding to a license plate area of the image; and
a processor configured to perform a first processing on the first portion of the image signal corresponding to the vehicle body area to modify first pixels corresponding to the vehicle body area of the image, and to perform a second processing on the second portion of the image signal corresponding to the license plate area to modify second pixels corresponding to the license plate area of the image, the first processing being different from the second processing,
wherein the first processing includes luminance/chrominance signal conversion processing to convert the first portion of the image signal corresponding to the vehicle body area to a luminance signal corresponding to the vehicle body area and a chrominance signal corresponding to the vehicle body area.

11. The image processing device according to claim 10, wherein the first processing includes three-dimensional noise reduction processing to remove noise in the luminance signal corresponding to the vehicle body area and the chrominance signal corresponding to the vehicle body area by using luminance signals and chrominance signals belonging to a plurality of continuous frames.

12. An imaging device comprising:
an image sensor configured to generate an image signal; and
image processing circuitry configured to:
perform object motion detection to detect a portion of the image signal corresponding to a vehicle body area of an image;
detect a portion of the image signal corresponding to a license plate area of the image;
perform a first processing on the first portion of the image signal corresponding to the vehicle body area to modify first pixels corresponding to the vehicle body area of the image;
perform a second processing on the second portion of the image signal corresponding to the license plate area to modify second pixels corresponding to the license plate area of the image, the second processing being different from the first processing; and
synthesize a processed image signal corresponding to the vehicle body area modified by the first processing and a processed image signal corresponding to the license plate area modified by the second processing.

13. An image processing method comprising:
performing object motion detection to detect a first portion of an image signal, the first portion of the image signal corresponding to a vehicle body area of an image;
detecting a second portion of the image signal, the second portion of the image signal corresponding to a license plate area of the image;
performing a first processing on the first portion of the image signal corresponding to the vehicle body area to modify first pixels corresponding to the vehicle body area of the image;
performing a second processing on the second portion of the image signal corresponding to the license plate area to modify second pixels corresponding to the license plate area of the image, the second processing being different from the first processing; and
synthesizing a processed image signal corresponding to the vehicle body area modified by the first processing and a processed image signal corresponding to the license plate area modified by the second processing.

* * * * *